(12) United States Patent
Conrad

(10) Patent No.: US 11,534,702 B2
(45) Date of Patent: Dec. 27, 2022

(54) WATER STORAGE CHAMBER FOR AN APPLIANCE

(71) Applicant: Omachron Intellectual Property Inc., Hampton (CA)

(72) Inventor: Wayne Ernest Conrad, Hampton (CA)

(73) Assignee: Omachron Intellectuaal Property Inc., Hampton (CA)

( * ) Notice: Subject to any disclaimer, the term of this patent is extended or adjusted under 35 U.S.C. 154(b) by 0 days.

(21) Appl. No.: 16/943,598

(22) Filed: Jul. 30, 2020

(65) Prior Publication Data

US 2022/0032213 A1 Feb. 3, 2022

(51) Int. Cl.
| | |
|---|---|
| *B01D 19/00* | (2006.01) |
| *A47L 7/00* | (2006.01) |
| *A47L 11/34* | (2006.01) |
| *A47L 11/40* | (2006.01) |
| *F16K 31/06* | (2006.01) |

(52) U.S. Cl.
CPC ..... *B01D 19/0063* (2013.01); *B01D 19/0057* (2013.01); *A47L 7/0023* (2013.01); *F16K 31/0651* (2013.01)

(58) Field of Classification Search
CPC ............ B01D 19/0052; B01D 19/0063; B01D 45/12–16; A47L 7/0023; F16K 31/0651
USPC ................... 15/353; 433/92; 95/271; 96/157
See application file for complete search history.

(56) References Cited

U.S. PATENT DOCUMENTS

| | | | | |
|---|---|---|---|---|
| 2,692,026 A | * | 10/1954 | Frantz ..................... | B04C 11/00 96/408 |
| 2,760,595 A | * | 8/1956 | Pynor ....................... | B04C 5/15 55/425 |
| 3,243,043 A | * | 3/1966 | Thompson ................ | B04C 5/14 210/788 |
| 3,657,819 A | * | 4/1972 | Soderqvist ............. | A61C 17/12 433/92 |
| 3,816,982 A | * | 6/1974 | Regnault ............ | B01D 46/0045 55/337 |
| 3,847,571 A | * | 11/1974 | Cole, Jr. ................... | B04C 5/18 95/150 |
| 3,895,929 A | * | 7/1975 | Jysky .................... | E21B 21/015 55/334 |
| 4,184,506 A | * | 1/1980 | Varis ....................... | E03F 1/006 137/205 |

(Continued)

*Primary Examiner* — Minh Chau T Pham
(74) *Attorney, Agent, or Firm* — Philip C. Mendes da Costa; Bereskin & Parr LLP/S.E.N.C.R.L., s.r.l.

(57) ABSTRACT

An appliance comprising an air flow path extending from an air inlet, by which water and air are introduced to the appliance, to an air outlet. A water separator is positioned in the air flow path, which, when in operation, separates the water from the air. A water storage chamber is in fluid flow communication with the water separator, which stores the water separated from the air. The appliance also comprises an automatic closure member movable between an open position and a closed position. When the automatic closure member is in the open position, the water storage chamber is in fluid flow communication with the water separator; when in the closed position, the water storage chamber is isolated from the water separator. The automatic closure member moves from the open position to the closed position when the pressure in the water separator increases above a predetermined level.

15 Claims, 19 Drawing Sheets

(56) References Cited

U.S. PATENT DOCUMENTS

| | | | | |
|---|---|---|---|---|
| 4,293,300 A * | 10/1981 | Cattani | ............... | A61C 17/065 433/92 |
| 4,385,912 A * | 5/1983 | Parrick | ................ | B01D 45/16 55/329 |
| 4,684,345 A * | 8/1987 | Cattani | ............... | A61C 17/065 433/92 |
| 4,823,428 A * | 4/1989 | Sevigny | .................... | A47L 5/38 137/205 |
| 5,066,315 A * | 11/1991 | Haberl | ..................... | B04C 5/22 95/271 |
| 5,134,748 A * | 8/1992 | Lynn | ....................... | A47L 11/29 15/321 |
| 5,353,469 A * | 10/1994 | Fellhauer | ............. | A47L 7/0028 15/326 |
| 5,879,552 A * | 3/1999 | Bradfield | ............ | A61C 17/065 210/411 |
| 6,009,892 A * | 1/2000 | Martinitz | ........... | B01D 21/0024 137/1 |
| 6,217,635 B1 | 4/2001 | Conrad et al. | | |
| 6,513,187 B1 * | 2/2003 | Naseth, Sr. | ............... | A47L 5/38 137/205 |
| 7,619,183 B2 | 11/2009 | Conrad | | |
| 8,784,651 B2 * | 7/2014 | Moe | ..................... | A61C 17/065 210/104 |
| 10,687,679 B2 | 6/2020 | Conrad et al. | | |
| 2004/0197622 A1 * | 10/2004 | Wheat | ................... | B01D 45/12 429/413 |
| 2005/0194295 A1 * | 9/2005 | North | .................... | A47L 9/1608 209/725 |
| 2007/0251386 A1 * | 11/2007 | Swank | ..................... | B04C 5/13 95/271 |
| 2008/0092734 A1 * | 4/2008 | Benner | .................. | B04C 5/185 95/271 |
| 2011/0192711 A1 * | 8/2011 | Chevrette | ............ | B01D 5/0066 202/185.3 |
| 2012/0017553 A1 * | 1/2012 | Park | ...................... | A47L 9/1683 55/419 |
| 2013/0199137 A1 * | 8/2013 | Hallgren | ........... | B01D 46/2411 55/393 |
| 2017/0087494 A1 * | 3/2017 | Lee | ........................ | B01D 45/12 |
| 2019/0134649 A1 * | 5/2019 | Witter | ...................... | B04C 5/04 |

* cited by examiner

WATER STORAGE CHAMBER FOR AN APPLIANCE

FIELD

This disclosure relates generally to appliances that have water storage chambers that store water that has been separated from an incoming air stream.

INTRODUCTION

The following is not an admission that anything discussed below is part of the prior art or part of the common general knowledge of a person skilled in the art.

Various types of water storage chambers for storing water separated from an air flow, are known. For example, dehumidifiers typically have water storage chambers that collect water that has condensed and dripped off of a cooling coil. Carpet extractors also typically include water storage chambers that store dirty water that has been drawn into the appliance. Dehumidifiers and carpet extractors are similar in that they take in a water and air mixture, and use a water separator to sequester the water from the air, and store that separated water in a water storage chamber within the appliance.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In one aspect of this disclosure, which may be used by itself or with one or more of the other aspects disclosed herein, there is provided an appliance having a water separator that separates water from an air stream that enters the appliance and a water storage chamber in fluid flow communication with the water separator that stores the water separated from the air by the water separator. An example is a carpet extractor. In operation, a person may apply a cleaning solution to carpet. The carpet extractor may then be used to remove (suck) water from the carpet. The water is entrained in an air flow entering the extractor. The air stream may then be treated to remove some, and optionally all, of the water from the air stream entering the appliance.

The water and the air may be separated by any means known in the appliance arts, such as a momentum separator that uses a tortuous path, a cyclone separator, a sponge through which the air passes or the like. The separated water may travel to the water storage chamber, such as by gravity of a pump. Once in water storage chamber, some of the separated water may be re-entrained in the air stream if there is a sudden high flow rate of air through the water separator. Accordingly, the appliance may also comprise an automatic closure member that can interrupt the fluid flow communication between the water storage chamber and the water separator to reduce or inhibit or prevent such re-entrainment. That is, the water storage chamber may be partially or fully closed off from the water separator by the automatic closure member so that water within the storage chamber cannot inadvertently re-enter the water separator.

In accordance with the broad aspect, there is provided an appliance comprising:

(a) an air flow path extending from an appliance inlet, by which water and air are introduced to the appliance, to an air outlet;
(b) a water separator positioned in the air flow path, the water separator having a water separator inlet, a water separator air outlet, and a water separator water outlet wherein, when in operation, the water separator separates the water from the air;
(c) a water storage chamber in fluid flow communication with the water separator water outlet, wherein the water storage chamber stores water separated from the air by the water separator; and,
(d) an automatic closure member which is movable between an open position in which the water storage chamber is in fluid flow communication with the water separator and a closed position in which the water storage chamber is isolated from the water separator, wherein the automatic closure member moves from the open position to the closed position when the pressure in the water separator increases above a predetermined level.

In any embodiment, the automatic closure member may comprise a reconfigurable mechanical member which changes configuration when the pressure in the water separator increases above the predetermined level.

In any embodiment, the reconfigurable mechanical member may comprise a resilient member.

In any embodiment, the reconfigurable mechanical member may comprise a diaphragm.

In any embodiment, the automatic closure member may further comprise a valve drivenly connected to the reconfigurable mechanical member, the valve may isolate the water storage chamber from the water separator when the automatic closure member is in the closed position.

In any embodiment, the appliance may further comprise a solenoid operably connected to the valve wherein the solenoid may close the valve when the pressure in the water separator increases above a predetermined level.

In any embodiment, the automatic closure member may further comprise a valve mechanically drivenly connected to the reconfigurable mechanical member, the valve may isolate the water storage chamber from the water separator when the automatic closure member is in the closed position.

In any embodiment, the automatic closure member may further comprise a valve movable between an open position in which the water storage chamber is in fluid flow communication with the water separator and a closed position in which the water storage chamber is isolated from the water separator, a solenoid drivingly connected to the valve, and a sensor which may issue a closure signal to the solenoid when the pressure in the water separator increases above the predetermined level, wherein the solenoid may cause the valve to move to the closed position upon the sensor issuing the closure signal.

In any embodiment, the appliance may further comprise an override member operable to maintain the water storage chamber isolated from the water separator when the water storage chamber has a predetermined amount of water therein.

In any embodiment, the override member may comprise a sensor that issues a full signal upon the water storage chamber having the predetermined amount of water therein and the automatic closure member may be moved to the closed position upon the issuance of the full signal.

In any embodiment, the automatic closure member may further comprise a valve that isolates the water storage chamber from the water separator when the automatic closure member is in the closed position and the valve may be moved to the closed position upon the issuance of the full signal.

In any embodiment, the appliance may further comprise a shut off member operable to shut off the appliance when the water storage chamber has a predetermined amount of water therein.

In any embodiment, the shut off member may comprise a sensor that issues a full signal upon the water storage chamber having the predetermined amount of water therein and the appliance may be de-activated upon the issuance of the full signal.

In any embodiment, the sensor may comprise a pressure sensor, a float switch, an acoustic signaling member, or a temperature sensor.

In accordance with the broad aspect, there is also provided an appliance comprising:
(a) an air flow path extending from an appliance inlet, by which water and air are introduced to the appliance, to an air outlet;
(b) a water separator positioned in the air flow path, the water separator having a water separator inlet, a water separator air outlet, and a water separator water outlet wherein, when in operation, the water separator separates the water from the air;
(c) a water storage chamber in fluid flow communication with the water separator water outlet via a water storage passage, wherein the water storage chamber stores the water separated from the air by the water separator;
(d) a pump positioned in the water storage passage; and,
(e) an automatic closure member which is operable between an open position in which the pump is operable to transfer water to the water storage chamber and a closed position in which the pump is de-energized, wherein the automatic closure member moves from the energized position to the de-energized position when the pressure in the water separator increases above a predetermined level.

In any embodiment, the automatic closure member may comprise a reconfigurable mechanical member which may change configuration when the pressure in the water separator increases above the predetermined level, the reconfigurable mechanical member may be operably connected to the pump wherein the pump may be de-energized when the automatic closure member is in the closed position.

In any embodiment, the mechanical member may comprise a resilient member.

In any embodiment, the reconfigurable mechanical member may be mechanically connected to the pump.

In any embodiment, the appliance may further comprise an override member operable to maintain the pump in a de-energized state when the water storage chamber has a predetermined amount of water therein.

In any embodiment, the appliance may further comprise a shut off member operable to shut off the appliance when the water storage chamber has a predetermined amount of water therein.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1A:
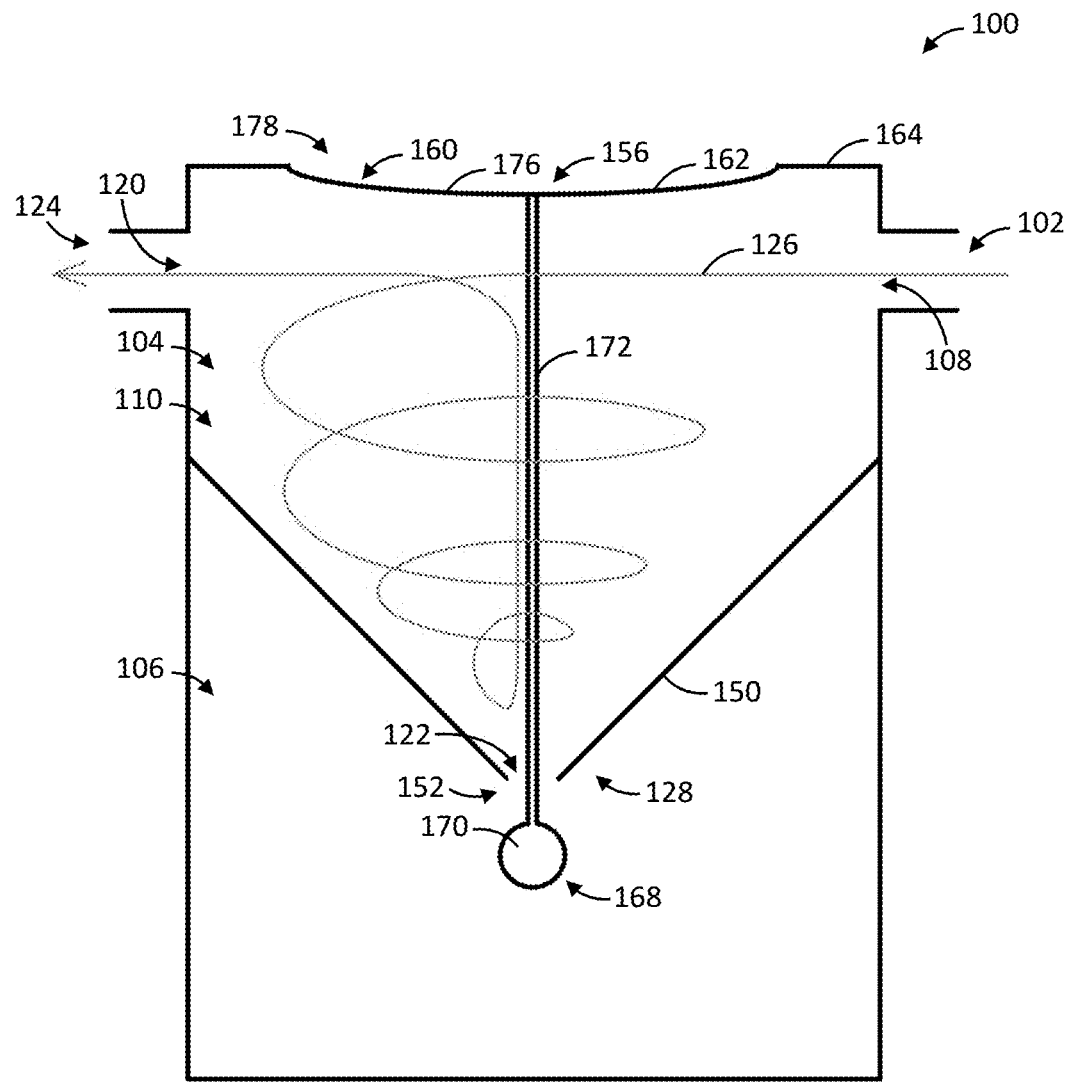
FIG. 1A is a schematic illustration of a water separator and a water storage chamber wherein the water separator is a cyclonic water separator and the water storage chamber is in fluid flow communication with the water separator.

The drawings included herewith are for illustrating various examples of articles, methods, and apparatuses of the teaching of the present specification and are not intended to limit the scope of what is taught in any way.

DESCRIPTION OF VARIOUS EMBODIMENTS

Various apparatuses will be described below to provide an example of an embodiment of each claimed invention. No embodiment described below limits any claimed invention and any claimed invention may cover apparatuses that differ from those described below. The claimed inventions are not limited to apparatuses having all of the features of any one apparatus described below or to features common to multiple or all of the apparatuses described below. It is possible that an apparatus described below is not an embodiment of any claimed invention. Any invention disclosed in an apparatus described below that is not claimed in this document may be the subject matter of another protective instrument, for example, a continuing patent application, and the applicants, inventors or owners do not intend to abandon, disclaim or dedicate to the public any such invention by its disclosure in this document.

The terms "an embodiment", "embodiment", "embodiments", "the embodiment", "the embodiments", "one or more embodiments", "some embodiments", and "one embodiment" mean "one or more (but not all) embodiments of the present invention(s)," unless expressly specified otherwise.

The terms "including", "comprising", and variations thereof mean "including but not limited to", unless expressly specified otherwise. A listing of items does not imply that any or all of the items are mutually exclusive, unless expressly specified otherwise. The terms "a", "an", and "the" mean "one or more", unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Some elements herein may be identified by a part number, which is composed of a base number followed by an alphabetical or subscript-numerical suffix (e.g. 112a, or $112_1$). Multiple elements herein may be identified by part numbers that share a base number in common and that differ by their suffixes (e.g. $112_1$, $112_2$, and $112_3$). All elements with a common base number may be referred to collectively or generically using the base number without a suffix (e.g. 112).

General Description of an Appliance

There are many types of appliances 100 that concurrently take in water and air through an appliance inlet 102, and, via a water separator 104, separate some or all of the water from the air within the appliance 100. In some examples, the separated water may be stored within the appliance 100 in a water storage chamber 106 for a period of time. The water storage chamber 106 may be emptied when, for example, the water storage chamber 106 is full. Alternatively, the appliance 100 may be in fluid flow communication with an external reservoir (not shown). When in fluid flow communication with an external reservoir, the separated water may be continuously or periodically transferred from the appliance 100 to the external reservoir. For example, the water storage chamber 106 may be removable for emptying and/or it may be provided with a drain plug which, when removed, allows the water storage chamber 106 to be emptied, e.g., when still mounted in the appliance.

Some example appliances 100 that concurrently take in water and air, and separate the water from the air within the appliance 100 are carpet extractors, steam cleaners, dehumidifiers, air cleaners and hair dryers, etc. Accordingly, although the following description is generally discussed with reference to a carpet extractor, it is to be understood that the principles and concepts described herein are applicable to all types of appliances, unless otherwise specified. Further, the description below is generally discussed with reference to water, but it is to be understood that any liquid, vapor, combination of liquids, combination of vapors, and/or combination of liquids and vapors may be drawn into the appliance 100.

As stated previously, the appliance 100 has an appliance inlet 102 (e.g., a nozzle) by which water and air are introduced to the appliance 100. The appliance inlet 102 may be located at any position on the appliance 100. For example, carpet extractors typically have an appliance inlet (nozzle) 102 located on a floor facing surface so that water on the floor may be readily sucked into the appliance 100. An air purifier or a hair dryer may have an air inlet provided on a front or rear face of the appliance.

To draw the water and air into the appliance 100, any suction motor (not shown) known in the art may be used. The particular suction motor used may be dependent on the typical operating characteristics of the appliance 100. For example, the suction motor used in a carpet extractor may be significantly larger, i.e., may generate a great flow volume, than the suction motor used in a hair dryer.

Further, the ratio of water to air, as well as the state of the water (i.e., liquid and/or vapor) when drawn into the appliance 100 may influence the type of suction motor used within the appliance 100. That is, for example, water in a liquid state (i.e., water with a soap solution) is typically drawn into a carpet extractor, whereas water alone may be drawn into a hair dryer and water in a vapor state (steam), optionally also with liquid water, is typically drawn into a steam cleaner and/or a dehumidifier. The typical ratio of water to air drawn into the appliance 100 when the appliance 100 is in use, as well as the typical state of the water when drawn into the appliance 100 may also influence the type of water separator 104 used within the appliance 100.

Water separators 104 have a water separator inlet 108, by which the water and the air are introduced to the water separator 104. The water separator inlet 108 is in fluid flow communication with the appliance inlet 102. Within the water separator 104, any means known in the art may be used to separate the water from the air. Some example means for separating water and air include, but are not limited to, cyclonic water separators 110 (see FIGS. 1A and 1B), mechanical water separators 112 which may use baffles or a tortuous path (see FIGS. 3A and 3B), Prandtl layer (spinning disk) water separators 114 (see FIGS. 4A and 4B), and dehumidifying cooling coils (not shown). Following separation, when in use, the air exits the water separator 104 via a water separator air outlet 120 and the water exits the water separator 104 via a water separator water outlet 122. It will be appreciated that all of the water may be removed from the air or only a portion thereof (e.g., 50 wt. %, 60 wt. %, 70 wt. %, 80 wt. % or 90 wt. % based on the total amount of water introduced into the appliance).

The water separator air outlet 120 may be an appliance air outlet 124 (i.e., may be a vent to the environment surrounding the appliance 100). Alternatively, the water separator air outlet 120 may be in fluid flow communication with the appliance air outlet 124. Regardless, an air flow path 126 extends from the appliance inlet 102 to the appliance air outlet 124.

Within the appliance 100, the water separator 104 is positioned in the air flow path 126. The water separator 104 may be located upstream or downstream of the suction motor and, optionally the water separator 104 is positioned upstream of the suction motor.

The water separator water outlet 122 may be located at any location within the water separator 104 that facilitates transfer of the separated water out from the water separator 104. Further, depending on the design of the water separator 104, there may be more than one water separator water outlets 122. It may be desirable to remove the separated water from the water separator 104 so that the water does not become re-entrained in a subsequent air flow. In the examples illustrated, the water separator water outlet 122 is located at a bottom region 128 of the water separator 104. Locating the water separator water outlet 122 at the bottom region 128 of the water separator 104 may allow for gravity to draw the separated water from the water separator 104 to, for example, the water storage chamber 106. As shown, the water separator 104 may be designed to promote movement of the separated water towards the water separator water outlet 122. Optionally, the separated water may flow to the water outlet at least in part by gravity.

Figure 3A:
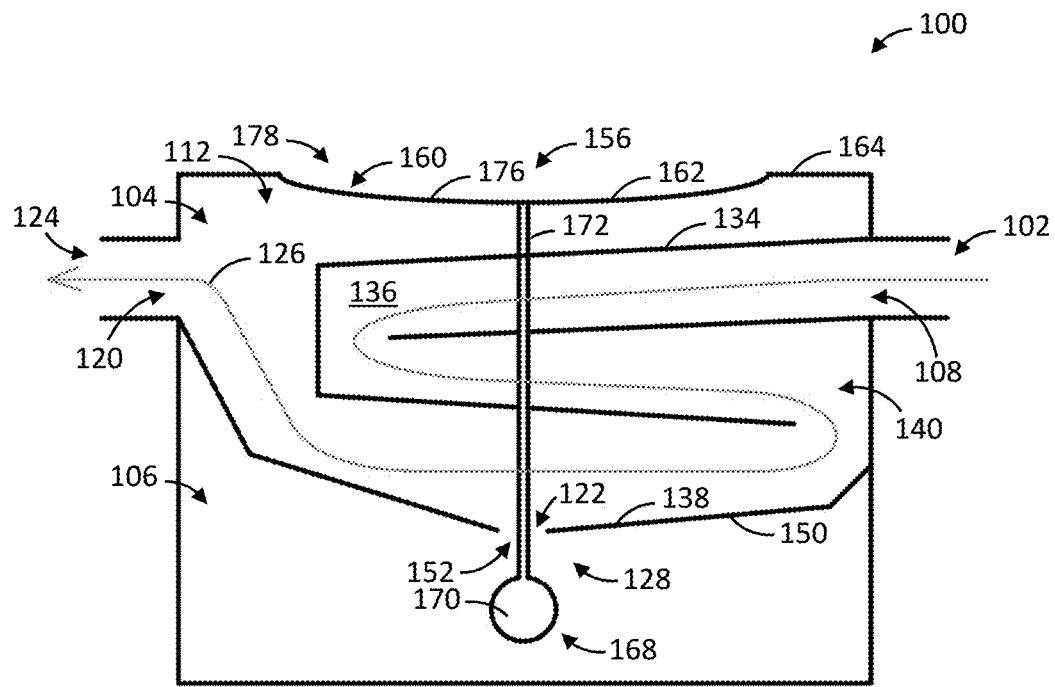
FIG. 3A is a schematic illustration of a water separator and a water storage chamber wherein the water separator is a mechanical water separator having a tortuous path and the water storage chamber is in fluid flow communication with the water separator.
Figure 3B:
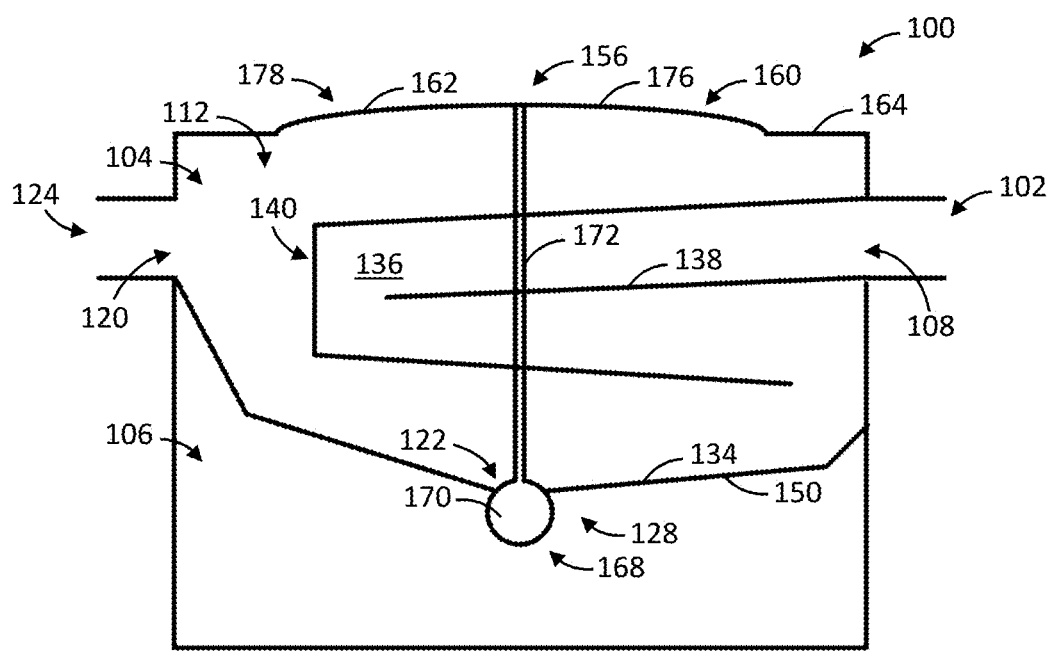
FIG. 3B is a schematic illustration of the water separator and water storage chamber of FIG. 3A wherein the water storage chamber is isolated from the water separator.

For example, referring to FIGS. 3A and 3B, the mechanical water separator 112 is formed from a series of walls 134 that define a tortuous channel 136 through which the air and water may flow (the air and water may be drawn through the channel 136 by, for example, the suction motor). As the air and water flow through the channel 136, the water (being heavier than the air and therefore not be able to change direction as quickly as the air) water will tend to condense and/or collect on an inner surface 138 of the outer wall of the channel 136. This effect may be enhanced by including sharp corners 140 in the channel 136. In the example illustrated, the channel 136 is designed such that any water that condenses and/or collects on the inner surface 138 of the channel 136 will be drawn by gravity to the water separator water outlet 122. That is, the walls 134 of the channel 136 are sloped downwardly so that the separated water may readily flow to the water separator water outlet 122.

Figure 4A:
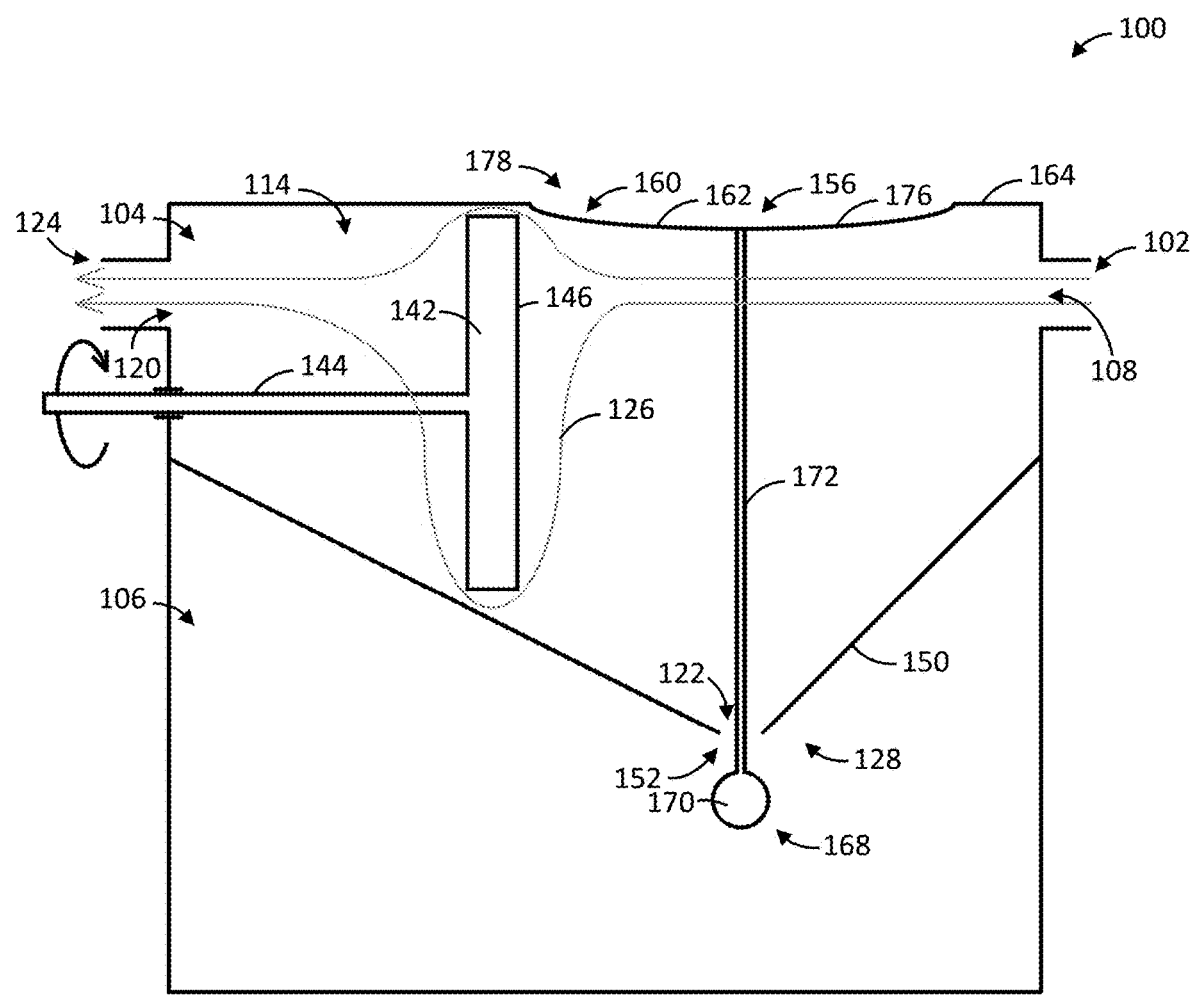
FIG. 4A is a schematic illustration of a water separator and a water storage chamber wherein the water separator is a Prandlt layer (spinning disk) water separator and the water storage chamber is in fluid flow communication with the water separator.
Figure 4B:
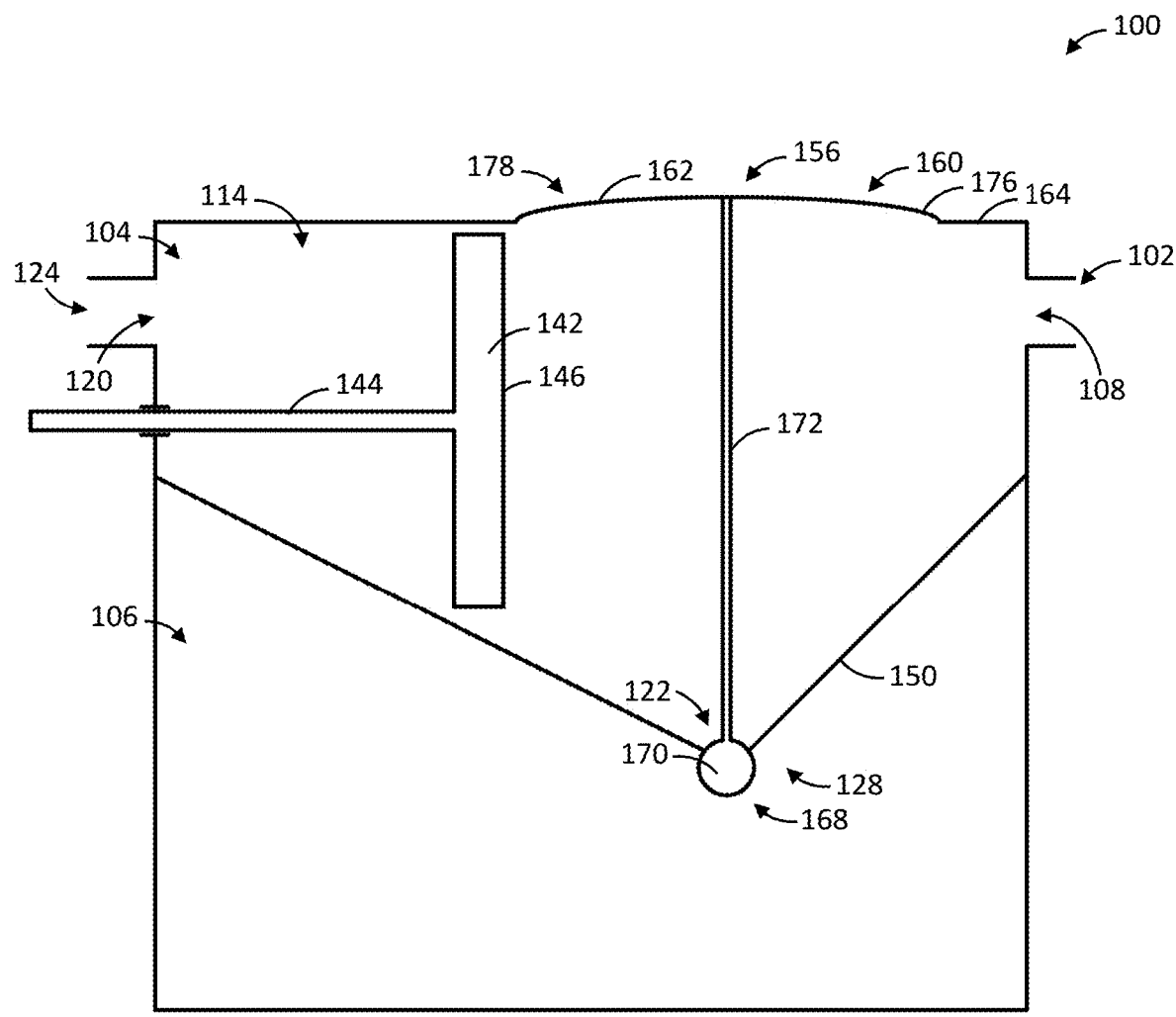
FIG. 4B is a schematic illustration of the water separator and water storage chamber of FIG. 4A, wherein the water storage chamber is isolated from the water separator.

As a second example, referring to FIGS. 4A and 4B, the Prandtl layer (spinning disk) water separator 114 is positioned so that the air and water that enters through the water separator inlet 108 flows to the rotatable disk 142 of the Prandtl layer (spinning disk) water separator 114. The rate of rotation of the spinning disc(s) will draw the air to rotate with the disc(s). As with a cyclone, the water will tend to be thrown outwardly while the air travels around the spinning disc(s). The spinning disk 142 may be driven by a shaft 144 wherein the shaft 144 may be an extension of the suction motor drive shaft. As shown, after contacting the disk 142, the air may pass through the water separator air outlet 120, and the water may pass to the water separator water outlet 122.

The water separator water outlet 122 may be in fluid flow communication with the water storage chamber 106. That is, a water storage passage 152 may extend from the water separator water outlet 122 to the water storage chamber 106. Accordingly, separated water may pass through the water separator water outlet 122 of the water separator 104 to the water storage chamber 106 via the water storage passage 152.

The water storage chamber 106 may be of any shape and configuration, and may be located at any position within the appliance 100 so long as it facilitates storage of the separated water. In some examples, the appliance 100 does not include an internal water storage chamber 106. Rather, the water separator may be in fluid flow communication with an external reservoir or water storage chamber. For example, a dehumidifier may remain stationary when in use, and therefore, a reservoir (i.e., a water storage chamber 106 external to the appliance 100) may be appropriate for such an appliance (discussed in more detail below). Alternatively, in some examples, an internal water storage chamber 106 may be in fluid flow communication with a reservoir. In this example, a valve may be provided that controls the flow from the water storage chamber 106 to the reservoir.

The water storage passage 152 may be of any type. As exemplified in FIG. 1A, the water storage passage 152 may be an opening in a bottom wall of the water separator. This design may be used if the water storage chamber 106 is located, for example, below the water separator 104. Alternately, as exemplified in FIG. 7A, the water storage passage 152 may be a conduit. This design may be used if the water storage chamber 106 or an external reservoir is located, for example, spaced from the water separator 104.

As described in detail below, the appliance 100 may include an automatic closure member 156. It may be desirable to include an automatic closure member 156 within the appliance 100 so that the water storage chamber 106 may be isolated from the water separator 104 when, for example, the appliance 100 is not in use or when the water storage chamber 106 is full or when there is a flow of air through the water separator 104 that may draw water from the water storage chamber 106 back into the air stream passing through the water separator 104. However, when the appliance 100 is in operation, the automatic closure member 156 allows for separated water to pass from the water separator 104 to the water storage chamber 106.

General Description of an Automatic Closure Member

The automatic closure member 156 may be of any shape and configuration that can selectively allow and/or restrict fluid flow communication between the water separator 104 and the water storage chamber 106. That is, when the automatic closure member 156 is in an open position (see FIG. 1A), the water storage chamber 106 is in fluid flow communication with the water separator 104; and when the automatic closure member 156 is in a closed position, the water storage chamber 106 is isolated from the water separator 104 (see FIG. 1B).

Any measurable and/or detectable characteristic of the appliance 100 may be used to signal the automatic closure member 156 to move from the open position to the closed position, and vice versa. For example, any one of a mechanical, electromechanical, electrical, thermomechanical, thermal sensor, optical sensor, acoustic sensor, moisture sensor, and/or pressure sensor signal may trigger the automatic closure member 156 to move from the open position to the closed position, and/or vice versa. In some examples, the automatic closure member 156 moves from the open position to the closed position when the pressure in the water separator 104 increases, e.g., above a predetermined level.

In operation, a suction motor will draw air through the appliance. The air may flow through the water separator 104 all of the time that the appliance is in use. Alternately, air may only flow through the water separator 104 during certain times that the appliance is in use. For example, if the appliance is a carpet extractor, air may only through the water separator 104 when water is being drawn from a carpet. If the carpet extractor is only used as, e.g., a vacuum cleaner, then the water separator 104 may be bypassed. Similarly, if the appliance is a hair dryer, then air may only through the water separator 104 when the hair dryer is used in a suction mode to draw water from hair.

When air is drawn through the water separator 104, the air pressure in the water separator 104 will be reduced, e.g., to a sub-atmospheric level, due to the flow produced by the suction motor. When water is being drawn from a carpet or hair, the pressure level in the water separator 104 will be further reduced due to the resistance to flow produced by the appliance inlet being in contact with the carpet or hair and drawing air and water through the carpet or hair. When the appliance inlet 102 is removed from the carpet or hair, then the resistance to flow into inlet 102 will be removed and the air flow rate (cfm) into the appliance 102 will be increased. For example, during a carpet cleaning operation, a user may draw the cleaning head of the extractor along carpet to withdraw water. The user may then lift the nozzle to move the nozzle to a new section of the carpet and then draw the nozzle across the new section. As a result, the pressure in the water separator 104 will increase when the nozzle is lifted off of the carpet to be moved to the new section of carpet, although the pressure may still be sub-atmospheric due to air still being drawn by the suction motor through the water separator 104. Similarly, when drying hair by suction, a user may draw the inlet of a hair dryer along hair to withdraw water. The user may then lift the nozzle to move the nozzle to a new section of hair and then draw the nozzle across the new section. As a result, the pressure in the water separator 104 will increase when the nozzle is lifted off of the hair to be moved to the new section of hair, although the pressure may still be sub-atmospheric due to air still being drawn by the suction motor through the water separator 104.

Accordingly, the predetermined level may be a pressure that is above the pressure measured within the water separator 104 during normal operating conditions of the water separator 104 when the appliance is drawing water from, e.g., carpet or hair. For example, when in use to draw water into the appliance, the pressure measured within the water separator 104 of the appliance may be approximately 20 kPa, 40 kpa, 60 kpa or 80 kpa. When the appliance is operating but the hair or carpet is not in contact with the nozzle, the pressure may suddenly increase by, e.g., 20 kPa, 40 kpa, 60 kpa or 80 kpa. This increase in pressure is accompanied by an increase in the air flow rate through the water separator 104. This increase in air flow may result in water being drawn from water storage chamber 106 into water separator 104 and then back into the air flow that exist the water separator 104.

The predetermined level may be, for example, 50 kPa. Accordingly, in this example, the automatic closure member 156 may move from the open position to the closed position when the pressure in the water separator increases above 50 kPa. It will be appreciated that the automatic closure member 156 may move from the open position to the closed position when the pressure in the water separator increases by more than, for example, 20 kPa, 40 kpa, 60 kpa or 80 kpa. Similarly, the automatic closure member 156 may move from the closed position to the open position when the pressure in the water separator decreases by more than, for example, 20 kPa, 40 kpa, 60 kpa or 80 kpa. The predetermined level for an appliance may be calculated for a particular appliance by measuring the pressure in the water separator 104 when the appliance is in operation and the inlet 102 is in contact with a surface from which water is to be drawn and the pressure in the water separator 104 when the appliance is in operation but the nozzle is removed from the surface.

It may also be desirable for the predetermined pressure to be a pressure having a magnitude between the magnitude of the pressure when the appliance 100 is in use and the magnitude of the pressure when the appliance 100 is not in use so that the automatic closure member 156 moves to the closed position when the appliance 100 is turned off (i.e., when there is no flow through the water separator 104). It may be desirable for the automatic closure member 156 to be in the closed position when the appliance 100 is off so that separated water cannot inadvertently pass from the water storage chamber 106 to the water separator 104 during, for example, transport of the appliance 100.

FIGS. 1A to 2B exemplify the use of a mechanical member to move the automatic closure member 156 from the open position to the closed position. As exemplified, the automatic closure member 156 includes a reconfigurable mechanical member 160 which changes configuration when the pressure in the water separator 104 increases above the predetermined level. The reconfigurable mechanical member 160 can be of any shape and configuration that facilitates movement of the automatic closure member 156 from the open position to the closed position.

Figure 1B:
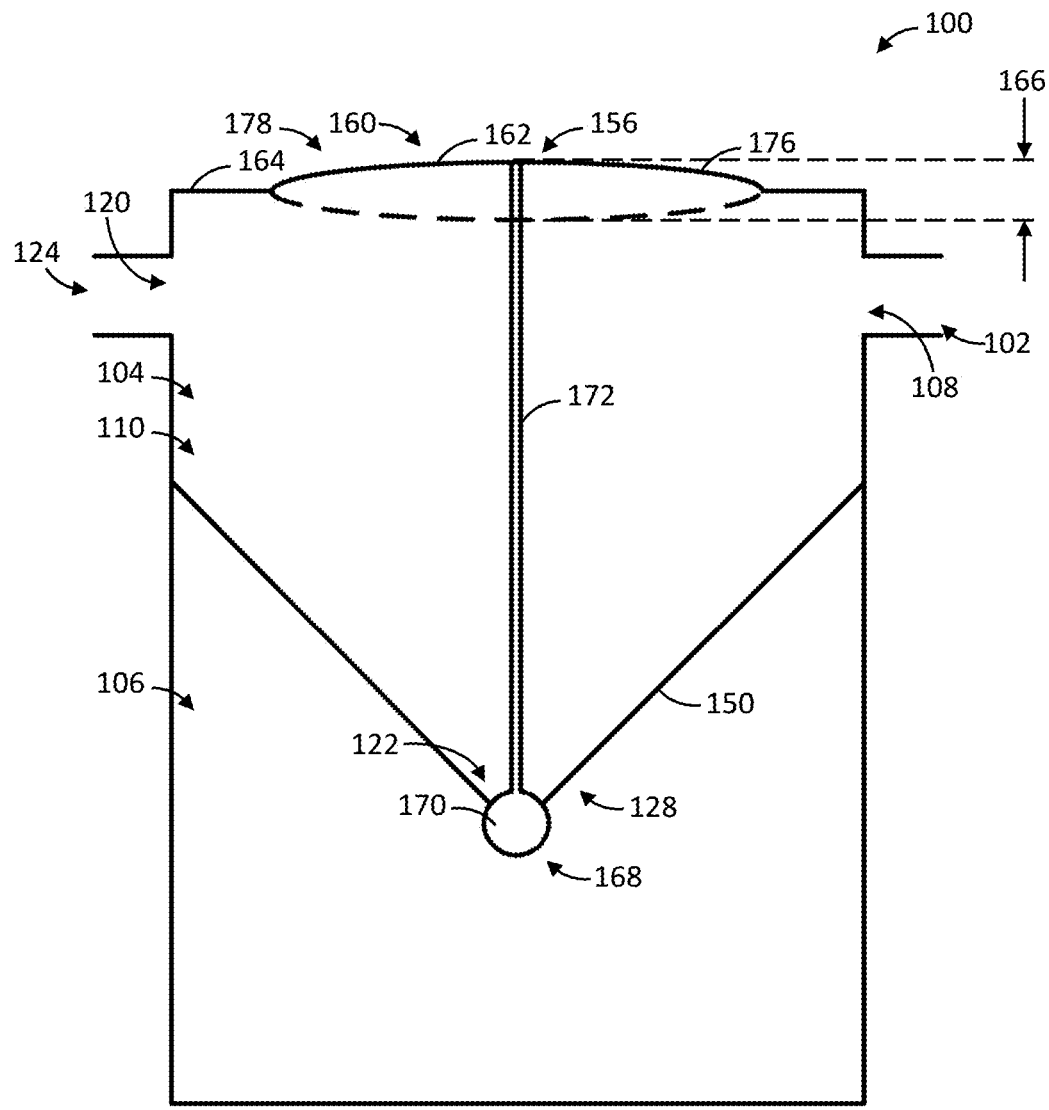
FIG. 1B is a schematic illustration of the water separator and water storage chamber of FIG. 1A wherein the water storage chamber is isolated from the water separator.

In the example illustrated in FIGS. 1A and 1B, the reconfigurable mechanical member 160 has a first position, in which a body 162 of the reconfigurable mechanical member 160 (i.e., the reconfigurable portion of the reconfigurable mechanical member 160) extends into the water separator 104, and a second position, in which the body 162 of the reconfigurable mechanical member 160 extends outwardly from the water separator 104 (in another example, the body 162 may sit flush with an upper wall 164 of the water separator 104 when in the second position). Accordingly, when moving from the first position to the second position, a region proximate the center of the body 162 translates vertically, a distance 166 (see FIG. 1B). It is to be understood that any configuration and position of the reconfigurable mechanical member 160 may be possible, and, accordingly, the reconfigurable mechanical member 160 may not translate vertically, but rather horizontally or diagonally. Further, the body 162 may be located at any vertical elevation with respect to the upper wall when in the open and the closed positions.

As shown in FIGS. 1A and 1B, the reconfigurable mechanical member 160 may include a valve 168 which translates with the body 162 of the reconfigurable mechanical member 160. That is, the valve 168 also translates a distance 166 when the reconfigurable mechanical member 160 moves from the first position to the second position. In the example illustrated, the valve 168 is in the form of a plug 170 drivenly connected to the body 162 of the reconfigurable mechanical member 160 by a tie rod 172. However, any shape and configuration of valve may be used. It will be appreciated that valve 168 may translate a different distance than body 162.

Still referring to FIGS. 1A and 1B, when the reconfigurable mechanical member 160 is in the first or open position, the valve 168 may be spaced from the water separator water outlet 122 and/or the water storage passage 152 (i.e., the automatic closure member 156 is in the open position and the water separator 104 is in fluid flow communication with the water storage chamber 106), and when the reconfigurable mechanical member 160 is in the second or closed position, the valve 168 may abut and seal the water separator water outlet 122 and or close the water storage passage 152 (i.e., the automatic closure member 156 is in the closed position and the water separator 104 is isolated from the water storage chamber 106).

Figure 2A:
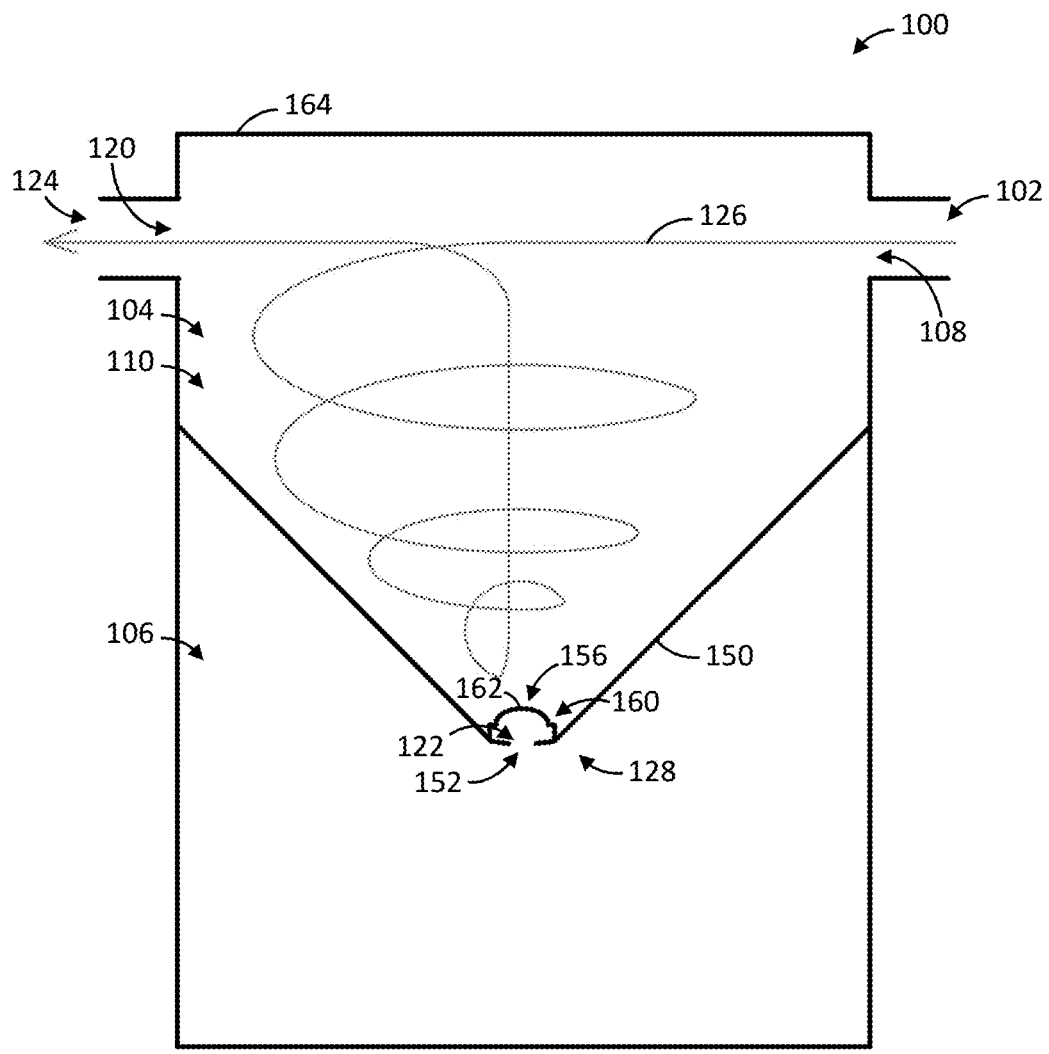
FIG. 2A is a schematic illustration of a water separator and a water storage chamber wherein the water separator is a cyclonic water separator and the water storage chamber is in fluid flow communication with the water separator.
Figure 2B:
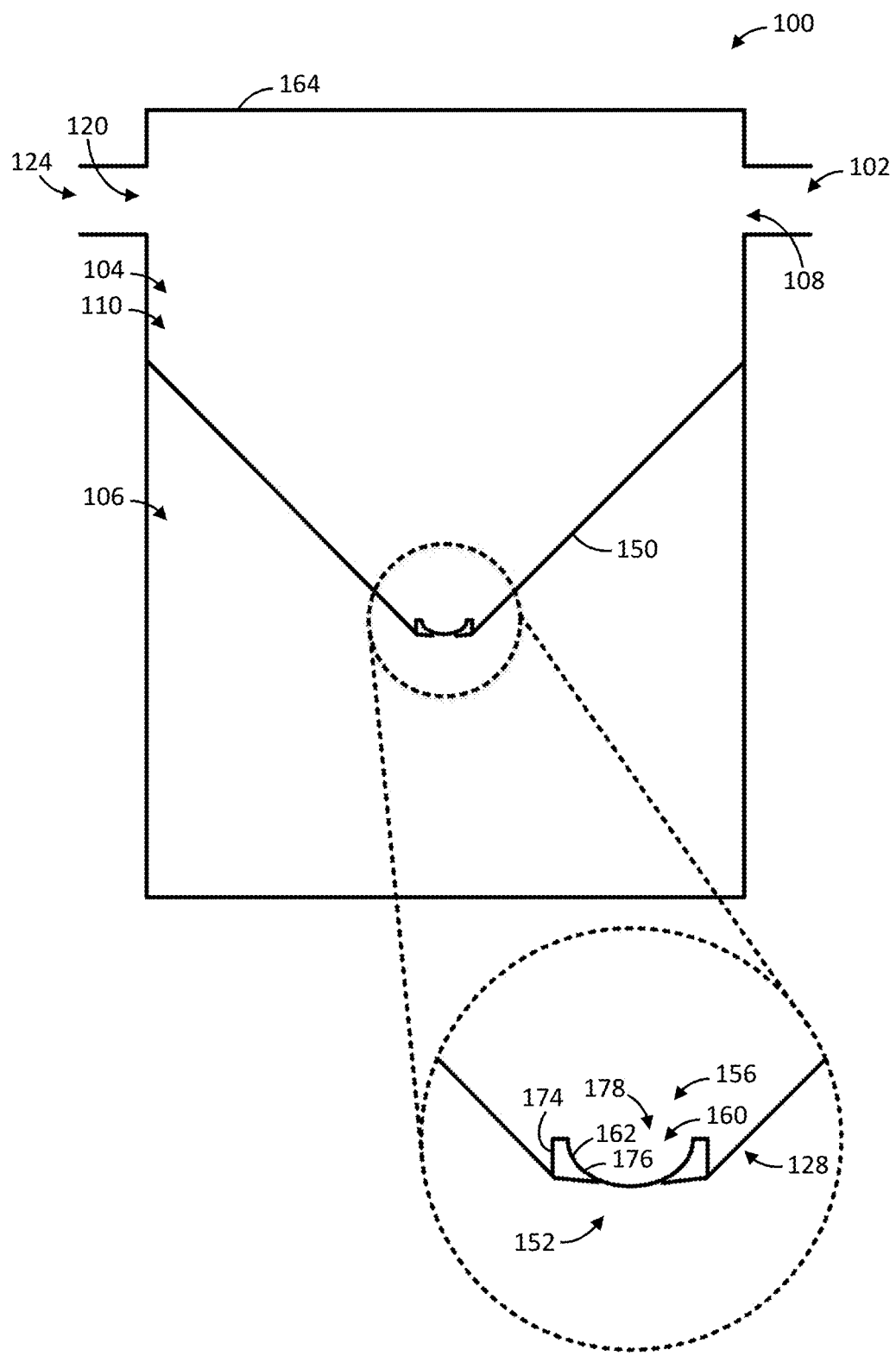
FIG. 2B is a schematic illustration of the water separator and water storage chamber of FIG. 2A wherein the water storage chamber is isolated from the water separator.

Referring now to FIGS. 2A and 2B, an alternative example of a reconfigurable mechanical member 160 is shown. The reconfigurable mechanical member 160 shown in FIGS. 2A and 2B is similar to that of 1A and 1B, however, the reconfigurable mechanical member 160 does not include a valve 168. In the example illustrated, the body 162 of the reconfigurable mechanical member 160 abuts and seals the water separator water outlet 122 when in the closed position. To facilitate translation of the reconfigurable mechanical member 160 towards and away from the water separator water outlet 122, the reconfigurable mechanical member 160 may be positioned on a water permeable platform 174 (i.e., a mesh or slotted platform). Accordingly, the body 162 may itself act as the valve.

In some examples, a user of the appliance 100, or an additional motor (not shown) may be used to reposition the reconfigurable mechanical member 160 to the first position after the reconfigurable mechanical member 160 moves from the first position to the second position. Alternatively, the reconfigurable mechanical member 160 of the automatic closure member may automatically move to the first position from the second position in response to an increase in pressure in the water separator 104.

The reconfigurable mechanical member 160 of the automatic closure member may be any member that can be reconfigured by pressure changes. The reconfigurable mechanical member 160 may comprise or consist of a resilient member 176. As exemplified in FIGS. 1A and 1B, the reconfigurable mechanical member 160 comprises a diaphragm 178. Diaphragm 178 may move from the open position to the closed position when the pressure in the water separator 104 increases above a predetermined level, and may move from the closed position to the open position when the pressure in the water separator 104 decreases below the predetermined level.

Figure 5A:
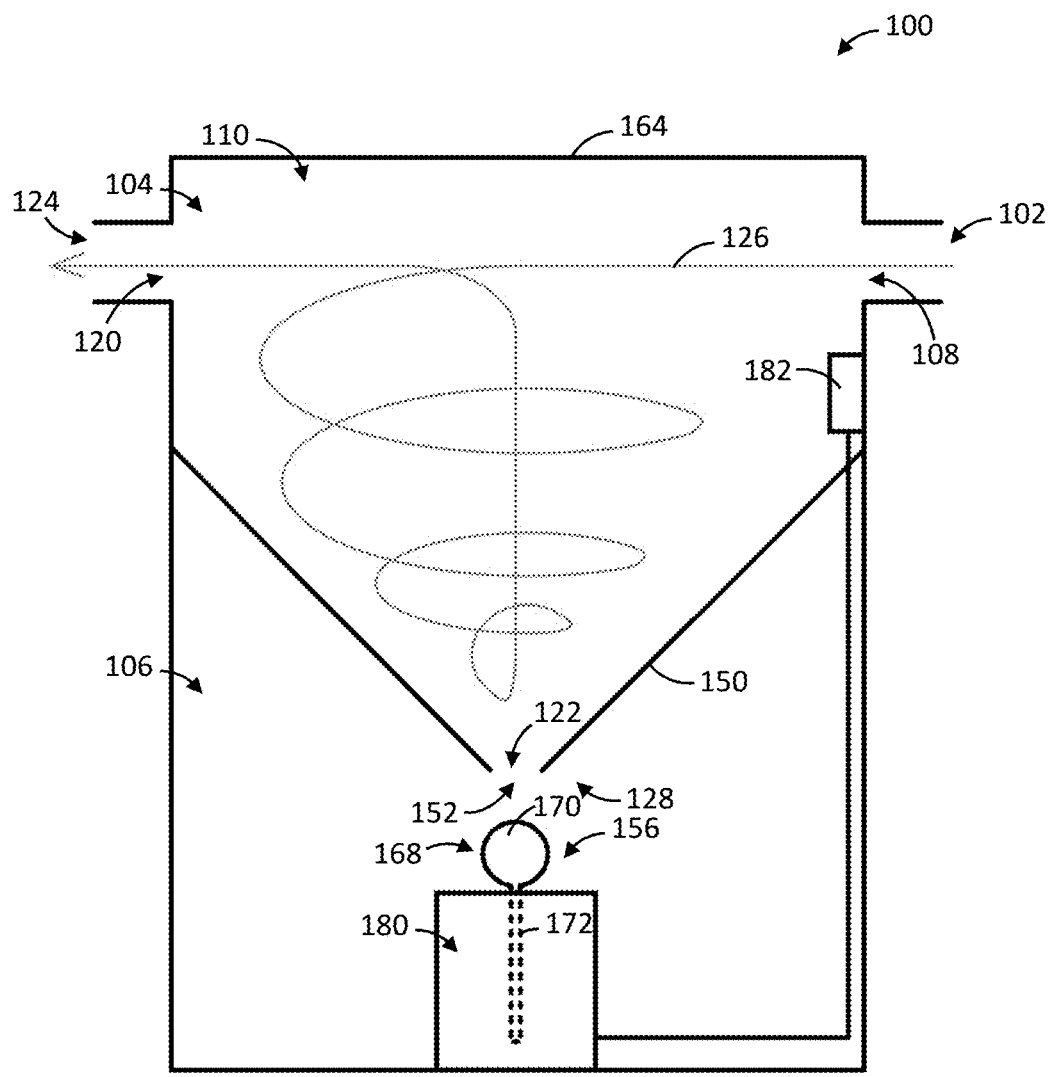
FIG. 5A is a schematic illustration of a water separator and a water storage chamber wherein the water separator is a cyclonic water separator and the water storage chamber is in fluid flow communication with the water separator.
Figure 5B:
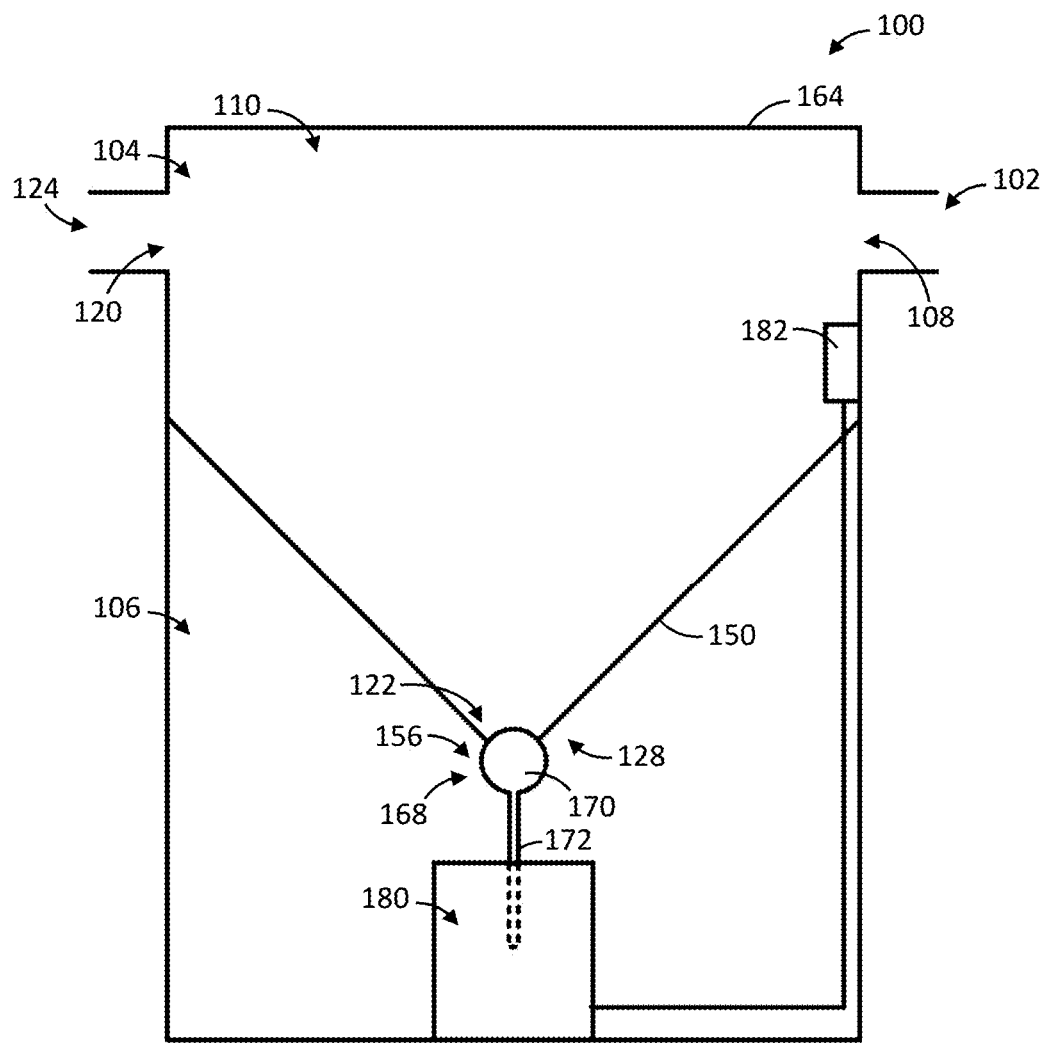
FIG. 5B is a schematic illustration of the water separator and water storage chamber of FIG. 5A wherein the water storage chamber is isolated from the water separator.

FIGS. 5A and 5B exemplify an automatic closure member that uses a sensor as an actuator. As exemplified, a solenoid 180 may be operably connected to a valve 168 so that the solenoid 180 moves the valve 168 from the open position (i.e., the water separator 104 is in fluid flow communication with the water storage chamber 106) (see FIG. 5A) to the closed position (i.e., the water separator 104 is isolated from the water storage chamber 106) (see FIG. 5B). Alternately or in addition, the solenoid 180 may be operable to also move the valve 168 from the closed position to the open position.

As described previously, any measurable and/or detectable characteristic of the appliance 100 may be used to signal the solenoid 180 to transition the valve 168 from the open position to the closed position, and vice versa. As exemplified, the sensor is a pressure sensor 182, that may be located within the water separator 104. Pressure sensor 182 issues a signal to the solenoid 180 to open and/or close the valve 168. That is, when the pressure in the water separator 104 is measured above the predetermined level, the pressure sensor 182 may issue a closure signal to the solenoid 180 to close the valve 168; and when the pressure in the water separator 104 is measured below the predetermined level, the pressure sensor 182 may issue an open signal the solenoid 180 to open the valve 168. The pressure sensor 182 may be any type of pressure sensor known in the art.

It will be appreciated that the sensor may be provided at an alternate location in the appliance and may send a signal based on one or more of a change in the clarity of the air stream (an optical sensor), the temperature of the air stream (a thermal sensor), the humidity or moisture level of the air (a moisture sensor), the conductivity of the air (a conductivity sensor), the sound of the air passing through a part of the appliance (an acoustic sensor) or the like.

It will also be appreciated that the solenoid 180 may be signaled by the reconfiguration and/or movement of the reconfigurable mechanical member 160. Any sensor known in the art capable of measuring the position of the reconfigurable mechanical member 160 may be used. For example, the reconfigurable mechanical member 160 may be conductive, and the magnitude of the conductivity of the reconfigurable mechanical member 160 may be dependent on the position of the reconfigurable mechanical member 160. That is, the magnitude of the conductivity of the reconfigurable mechanical member 160 in the first position may differ from the magnitude of the conductivity of the reconfigurable mechanical member 160 in the second position. Therefore, based on a measured conductivity of the reconfigurable mechanical member 160, the solenoid 180 may be signaled to position the valve 168 in the open and/or closed position.

General Description of an Override Member

In accordance with one aspect of this disclosure, which may be used by itself or in combination with any other aspect of this disclosure, the appliance 100 has an override member 186 which can isolate the water storage chamber 106 from the water separator 104 when the water storage chamber is full.

As exemplified in FIGS. 6A to 6E, the appliance 100 shown therein includes an override member 186. The override member 186 is operable to maintain the water storage chamber 106 in isolation from the water separator 104 when the water storage chamber 106 has a predetermined amount of water therein. The override member 186 may have any shape and configuration that facilitates isolation of the water storage chamber 106 from the water separator 104. For example, the override member 186 may be (a) a component completely separate from the automatic closure member 156 operable to isolate the water storage chamber 106 from the water separator 104 (see FIGS. 6A and 6B); (b) a component separate from the automatic closure member 156, but acts on the automatic closure member 156 to isolate the water storage chamber 106 from the water separator 104 (see FIGS. 6C and 6D); or (c) a component capable of issuing a full signal to the automatic closure member 156 to isolate the water storage chamber 106 from the water separator 104 (see FIG. 6E).

Figure 6A:
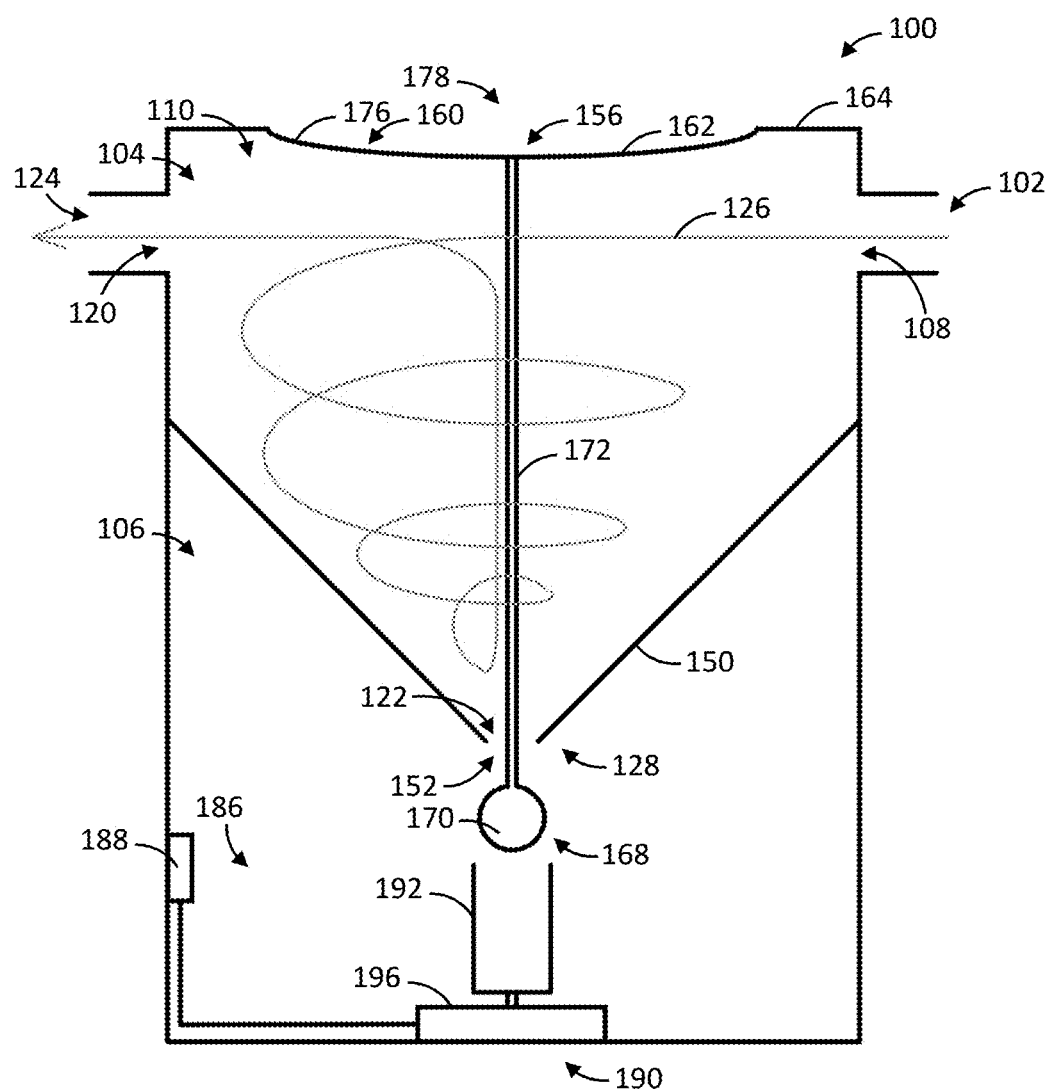
FIG. 6A is a schematic illustration of a water separator, a water storage chamber, and an override member wherein the water separator is a cyclonic water separator and the water storage chamber is in fluid flow communication with the water separator.
Figure 6B:
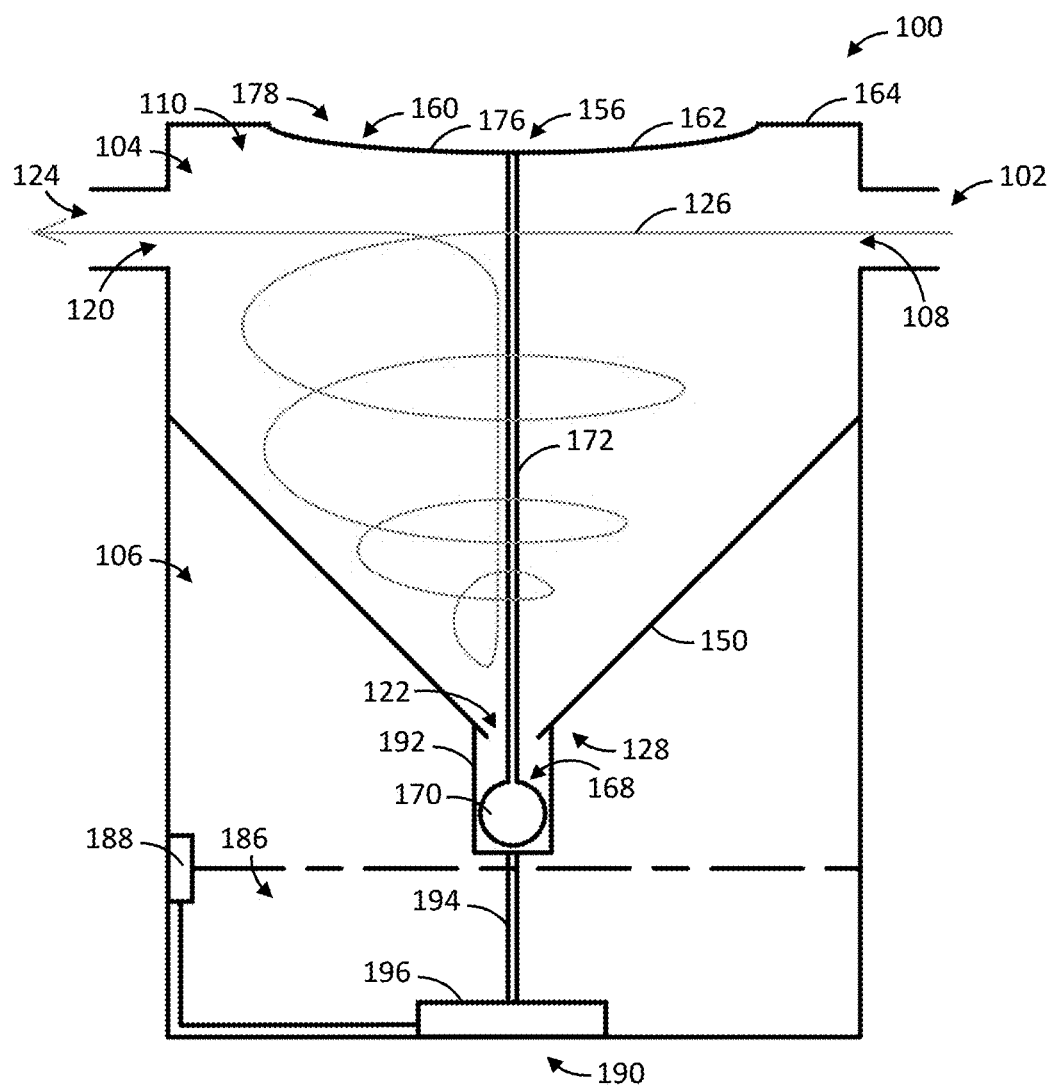
FIG. 6B is a schematic illustration of the water separator, water storage chamber, and override member of FIG. 6A wherein the water storage chamber is isolated from the water separator by the override member.

In the example illustrated in FIGS. 6A and 6B, the override member 186 is an electromechanical component completely separate from the automatic closure member 156. That is, the override member 186 operates independently of the automatic closure member 156. As shown, the override member 186 may include a sensor 188 within the water storage chamber 106 used to detect and issue a full signal when the water storage chamber 106 has a predetermined amount of water therein (the dashed line in FIGS. 6B, 6D, and 6E are representative of the predetermined amount of water). That is, upon detecting that the amount of water within the water storage chamber 106 is above the predetermined amount of water, the sensor 188 may issue a full signal to a closure member 190 of the override member 186 to isolate the water storage chamber 106 from the water separator 104. In the example illustrated, the closure member 190 is a plug 192 on a tie rod 194 that together are vertically translatable by an actuator 196 of the closure member 190. In the example illustrated, the plug 192 can seal the water separator water outlet 122 and/or the water storage passage 152. Closure member 190 may be a solenoid that moves the plug vertically when a full signal is issued by sensor 188. In another example, the closure member 190 of the override member 186 may form a blockage within the water storage passage 152 (e.g., the override member 186 may be a closeable valve, controlled by a sensor 188, the valve located in the water storage passage 152).

It will be appreciated that, in an alternate embodiment, the override member 186 may not include a sensor 188 or an actuator 196. For example, in FIGS. 6A and 6B, sensor 188 may not be provided. Instead, the closure member 190 of the override member 186 may float, and therefore, when the water level in the water storage chamber 106 reaches the predetermined amount, the closure member 190 may be lifted (i.e., floated) to a position that covers the water separator water outlet 122 and/or the water storage passage 152, isolating the water storage chamber 106 from the water separator 104.

It will be appreciated that sensor 188 may be any sensor that can issue a full signal upon the water storage chamber 106 having the predetermined amount of water therein. For example, the sensor may sense moisture, conductivity or the like. If sensor 188 issues an electrical signal, then the automatic closure member 156 may comprise any electrically actuated member (e.g., a solenoid, stepper motor of the like) that can move a valve (e.g., a plug) to the closed position upon the issuance of the full signal.

Figure 6C:
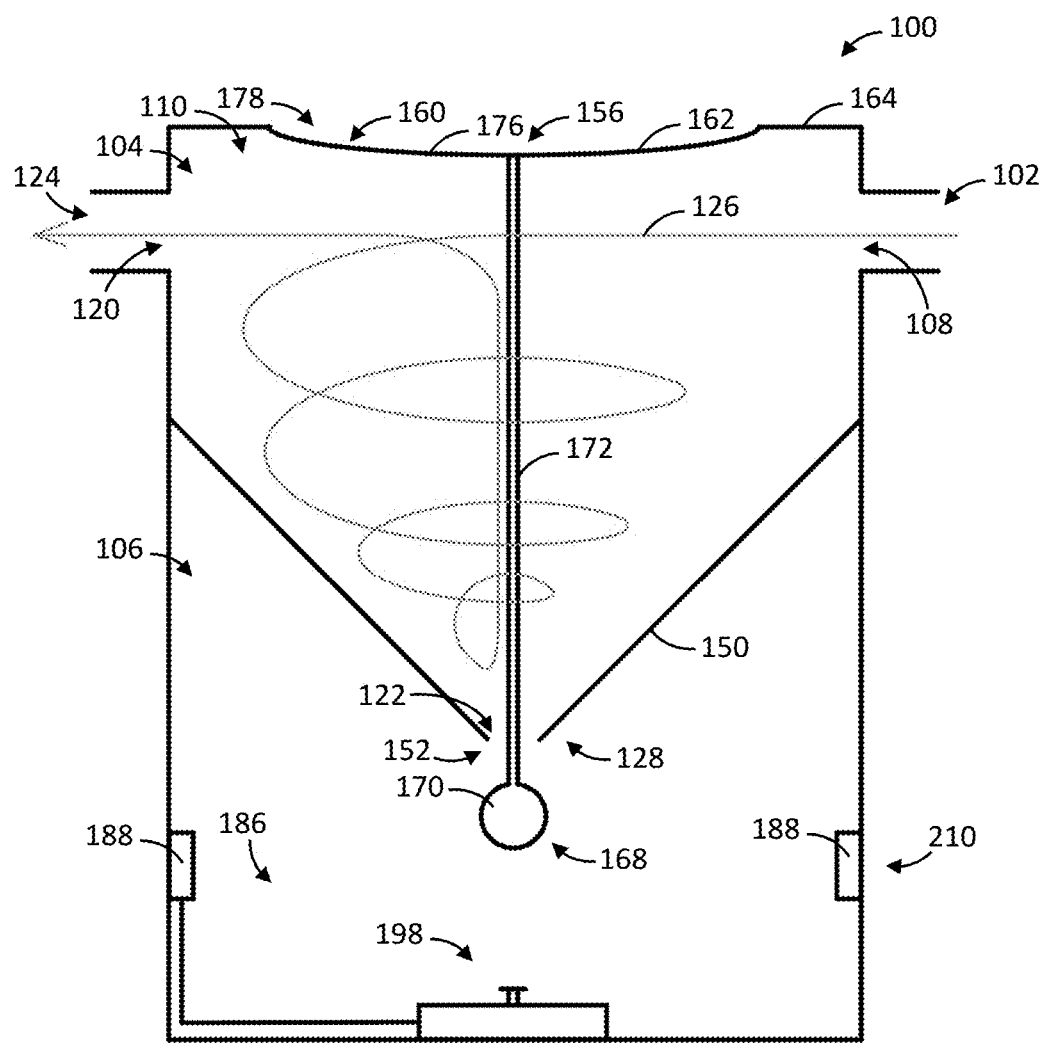
FIG. 6C is a schematic illustration of a water separator, a water storage chamber, and an override member wherein the water separator is a cyclonic water separator and the water storage chamber in fluid flow communication with the water separator.
Figure 6D:
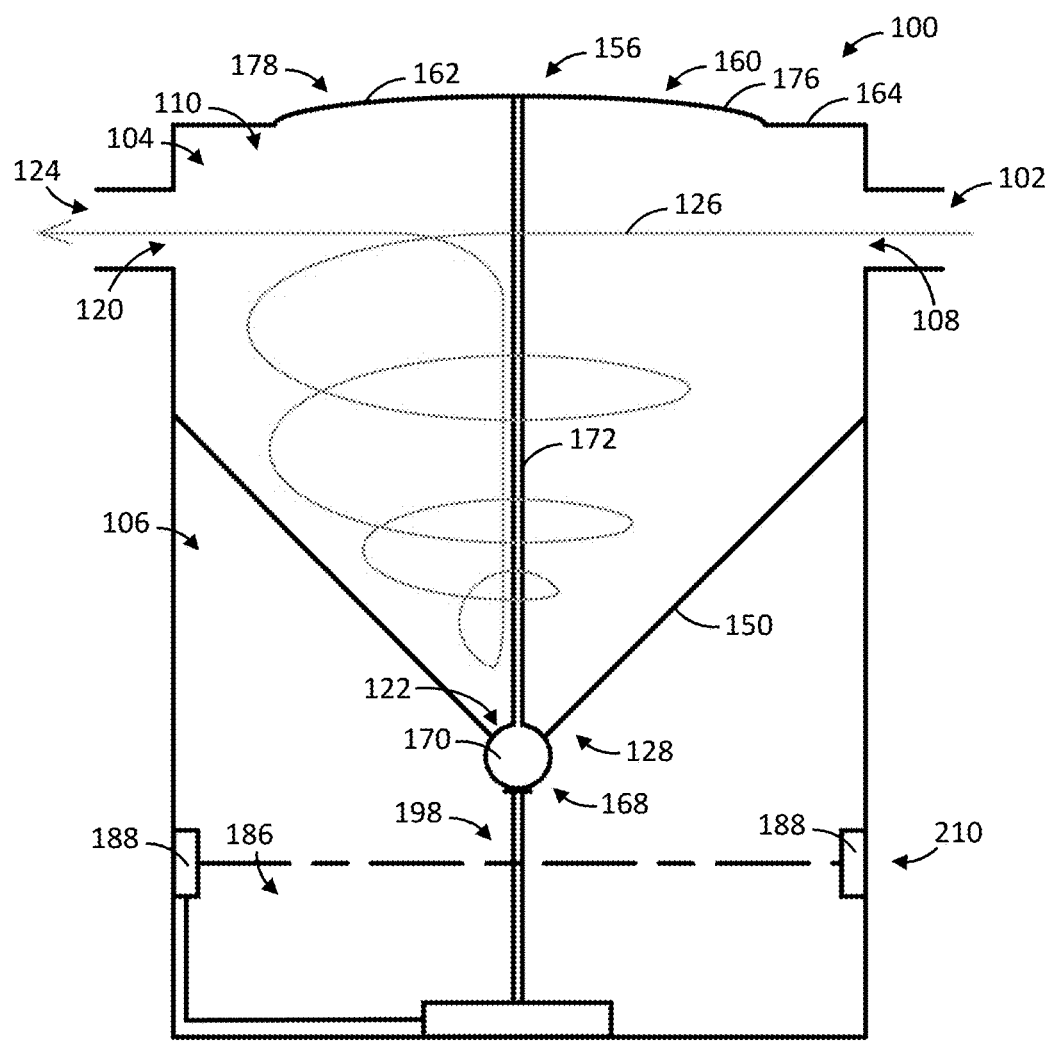
FIG. 6D is a schematic illustration of the water separator, water storage chamber, and override member of FIG. 6C wherein the water storage chamber is isolated from the water separator.
Figure 6E:
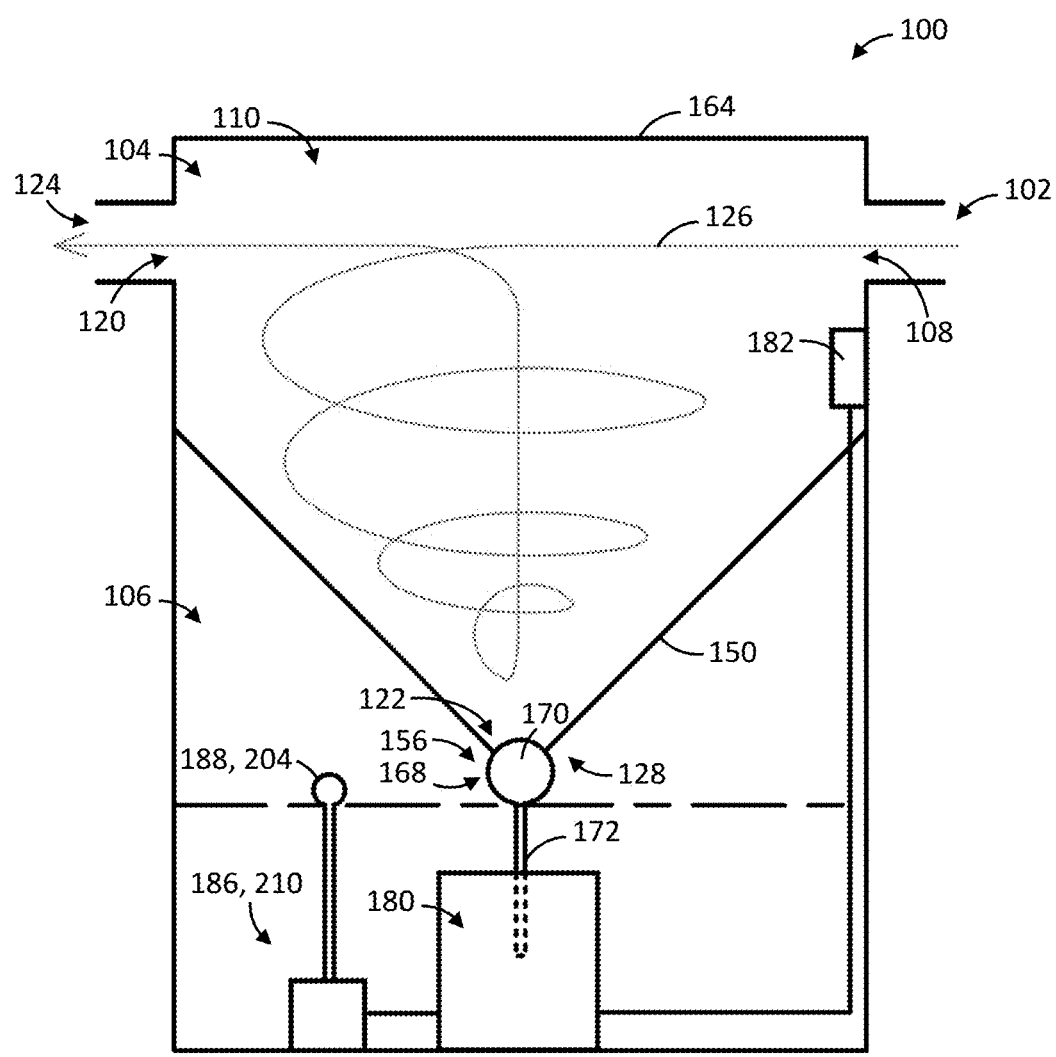
FIG. 6E is a schematic illustration of a water separator, a water storage chamber, and an override member wherein the water separator is a cyclonic water separator and the water storage chamber is isolated from the water separator.

As exemplified in FIGS. 6C and 6D, the override member 186 is an electromechanical component separate from the automatic closure member 156, but acts on the automatic closure member 156 to isolate the water storage chamber 106 from the water separator 104. As shown, the override member 186 may include a ram 198 which acts on the automatic closure member 156, and urges the automatic closure member 156 to the closed position. Specifically, in the example illustrated, the ram 198 abuts the valve 168 of the automatic closure member 156 and pushes the automatic closure member 156 to the closed position. In this example, so long as the ram 198 has enough force, the effect of a pressure change on the reconfigurable mechanical member 160 will not cause the reconfigurable mechanical member 160 to move from one position to another. Accordingly, regardless of the pressure within the water separator 104, the ram 198 may push the automatic closure member 156 to the closed position when a sensor 188 of the override member 186 issues a full signal.

As a second example, referring now to FIG. 6E, the override member 186 may be a component capable of issuing a full signal to the automatic closure member 156 to isolate the water storage chamber 106 from the water separator 104. That is, the override member 186 may be a sensor 188 that can control the operation of the automatic closure member 156. The sensor 188 can be any sensor known in the art capable of determining when the amount of water within the water storage chamber 106 is above the predetermined amount of water, for example, but not limited to, a pressure sensor, a float switch, an acoustic signaling member, or a temperature sensor. In the example illustrated, the sensor 188 is a float switch 204 which may issue a full signal to the automatic closure member 156, which, in the example illustrated, is a valve 168 movable by a solenoid 180. The full signal issued from the override member 186 may signal the automatic closure member 156 move and/or remain in the closed position regardless of the operating state of the appliance 100. That is, a pressure sensor 182 may measure a pressure below the predetermined level and issue a signal to the automatic closure member 156 to move to the open position; however, if the override member 186 detects that the amount of water in the water storage chamber 106 is above the predetermined amount of water, the automatic closure member 156 will not move to the open position, per the issue signal from the pressure sensor 182, but rather, close/remain closed based on issue signal from the override member 186.

General Description of a Shut Off Member

In accordance with one aspect of this disclosure, which may be used by itself or in combination with any other aspect of this disclosure, the appliance 100 has a shut off member 210. The shut off member 210 is operable to shut off the appliance 100 when the water storage chamber 106 has a predetermined amount of water therein.

An advantage of this aspect is that air may not flow through the appliance when the water storage chamber is full. This aspect may also be used in conjunction with the override member to isolate the water storage chamber 106 when the water storage chamber is full.

It will be appreciated that the shut off member may use the same actuator (sensor) as the override member or may use a separate actuator.

Accordingly, the shut off member 210 may include a sensor 188 that issues a full signal upon the water storage chamber 106 having the predetermined amount of water therein. Any sensor know in the art may be used, for example, but not limited to, a pressure sensor, a float switch, an acoustic signaling member, or a temperature sensor.

In some examples, the issued full signal may de-activate the appliance 100, completely. That is, the appliance 100 may be unable to be turned on until the water storage chamber 106 is emptied (i.e., until the shut off member 210 no longer senses that the water storage chamber 106 is full). For example, the sensor may issue a signal to a controller of the appliance which prevents the controller energizing the suction motor. Alternatively, if the appliance 100 has multiple functions, for example, if a hair dryer includes a suction drying mode of operation and a blow drying mode of operation, the issued full signal may de-activate only the functions of the appliance 100 associated with the water separator 104 (e.g., the suction drying mode of operation). For example, the sensor may issue a signal to a controller of the appliance which prevents the controller enabling one or more modes of operation.

As exemplified in FIG. 6E, the sensor 188 for the shut off member 210 may also act as the sensor 188 for the override member 186. That is, a single sensor 188 may (a) issue a full signal causing the appliance 100 to turn off; and (b) issue a full signal causing the override member 186 to isolate the water separator 104 from the water storage chamber 106. Alternatively, each of the shut off member 210 and the override member 186 may have a respective sensor 188 (see FIGS. 6C and 6D).

General Description of a Pump

In accordance with one aspect of this disclosure, which may be used by itself or in combination with any other aspect of this disclosure, the appliance 100 includes a pump 212. The pump 212 may be operable to move the separated water from the water separator 104 to the water storage chamber 106. Alternatively, the pump 212 may be operable to move the separated water from one of the water separator 104 and the water storage chamber 106 to a reservoir external to the appliance 100. In some examples, the appliance 100 may not include a water storage chamber 106.

The pump 212 may be any pump known in the art, and may be positioned in the water storage passage 152. Depending on the appliance, a water storage passage 152 may extend between (a) the water separator 104 and the water storage chamber 106; (b) the water separator 104 and the reservoir; and/or (c) the water storage chamber 106 and the reservoir.

Figure 7A:
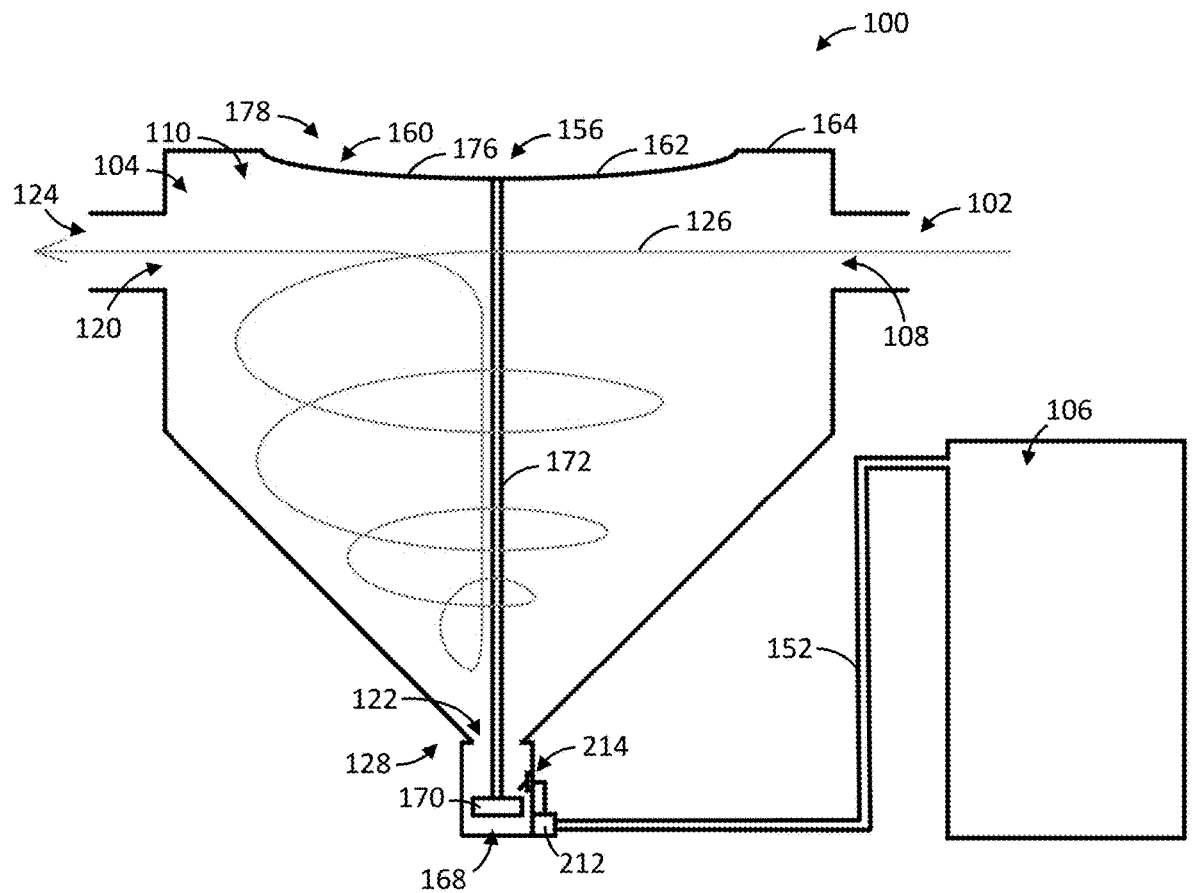
FIG. 7A is a schematic illustration of a water separator, a water storage chamber, and a pump wherein the water separator is a cyclonic water separator and the pump in an energized state (position)
Figure 7B:
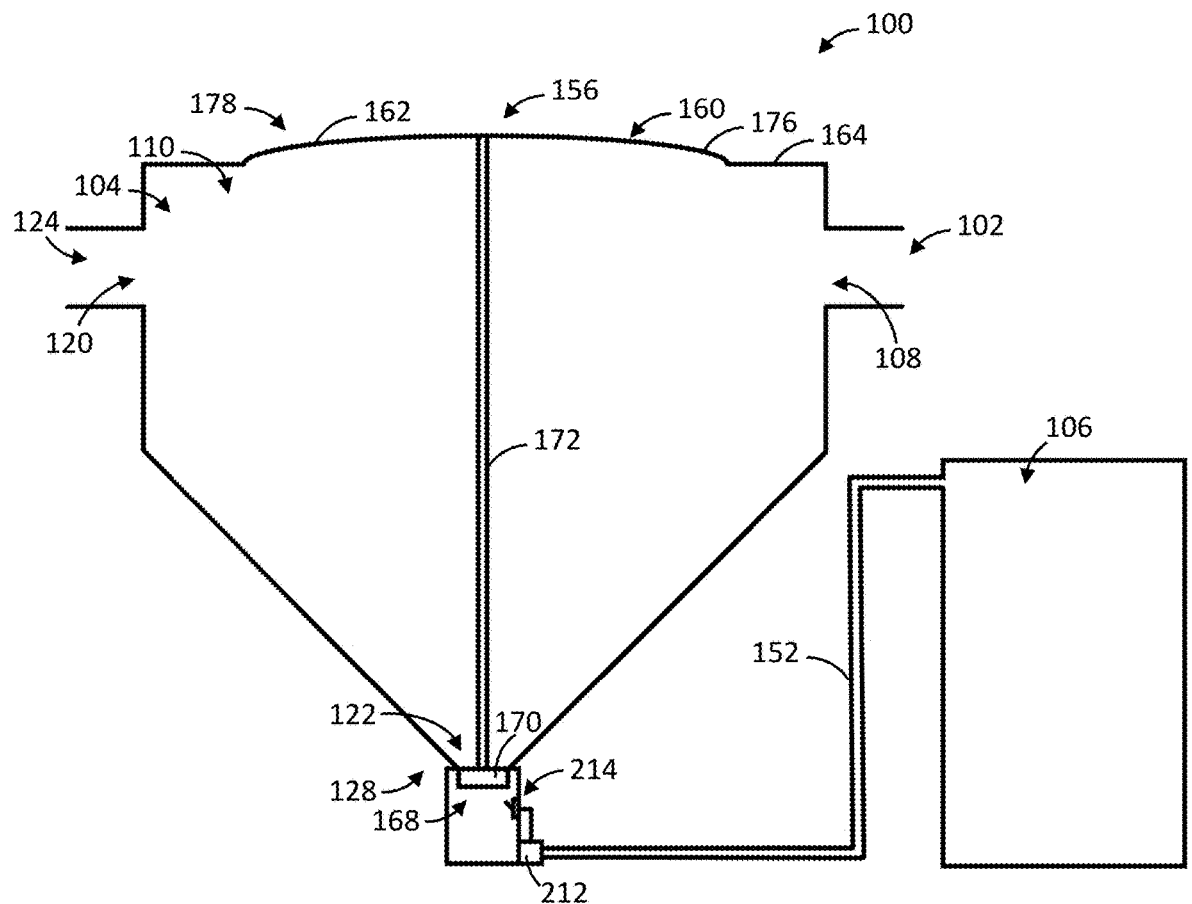
FIG. 7B is a schematic illustration of the water separator, water storage chamber, and pump of FIG. 7A wherein the pump in the de-energized state (position)

Referring to FIGS. 7A and 7B, in some appliances 100 it may be desirable to position the water storage chamber 106 to a side of the water separator 104 as opposed to beneath the water separator 104 (this may allow for an appliance 100 to have a relatively short design). In such an appliance 100, a pump 212 may be required to move the separated water to the water storage chamber 106.

In some appliances 100, it may be desirable to have a relatively small water storage chamber. For example, a carpet extractor may have a base for normal cleaning conditions (i.e., cleaning the floor) and lift-away component used to clean, for example, stairs (not shown). Accordingly, to limit the size and weight of the lift-away component, it may be desirable to have a small water storage chamber in the lift-away component, and a large water storage chamber in the base. The small water storage chamber may be in fluid flow communication with the large water storage chamber when the lift-away component is docked to the base, and a pump 212 may be required to move the separated liquid from the small water storage chamber to the large water storage chamber.

In some appliances 100, an internal water storage chamber 106 may not be required as the appliance 100 may be in fluid flow communication with an external reservoir (not shown). For example, a dehumidifier may be in fluid flow communication with a building's waste water system (i.e., an external reservoir). In this example, a pump 212 may be required to move the separated water from the water separator 104 to the waste water system.

Regardless of the appliance 100 and/or location/lack of the water storage chamber 106, the pump 212 has an energized state in which the pump 212 is operable to transfer water (i.e., the pump 212 is on) and a de-energized position in which the pump 212 is de-energized (i.e., the pump 212 is off). The pump 212 may transition between its energized state and its de-energized state based on a signal obtained from any measurable and/or detectable characteristic of the appliance 100.

For example, the pump 212 may be turned on when the appliance 100 is turned on. As a second example, the pump 212 may be turned on when a sensor detects air and/or water flow through the water separator. As a third example, referring to FIGS. 7A and 7B, in embodiments of the appliance including an automatic closure member 156, the pump 212 may be configured so that it is in the energized state when the automatic closure member 156 is in open position and is in the de-energized state when the automatic closure member 156 is in the closed position.

With regards to the third example, a sensor may be used to determine the position of the automatic closure member 156, and may control the state of the pump 212, accordingly. For example, a position sensor may detects the position of the automatic closure member 156. Optionally, as described above, the automatic closure member 156 may include a reconfigurable mechanical member 160 that is conductive. In this example, a sensor may measure the magnitude of the conductivity of the reconfigurable mechanical member 160 and may control the state of the pump 212, accordingly.

Figure 8A:
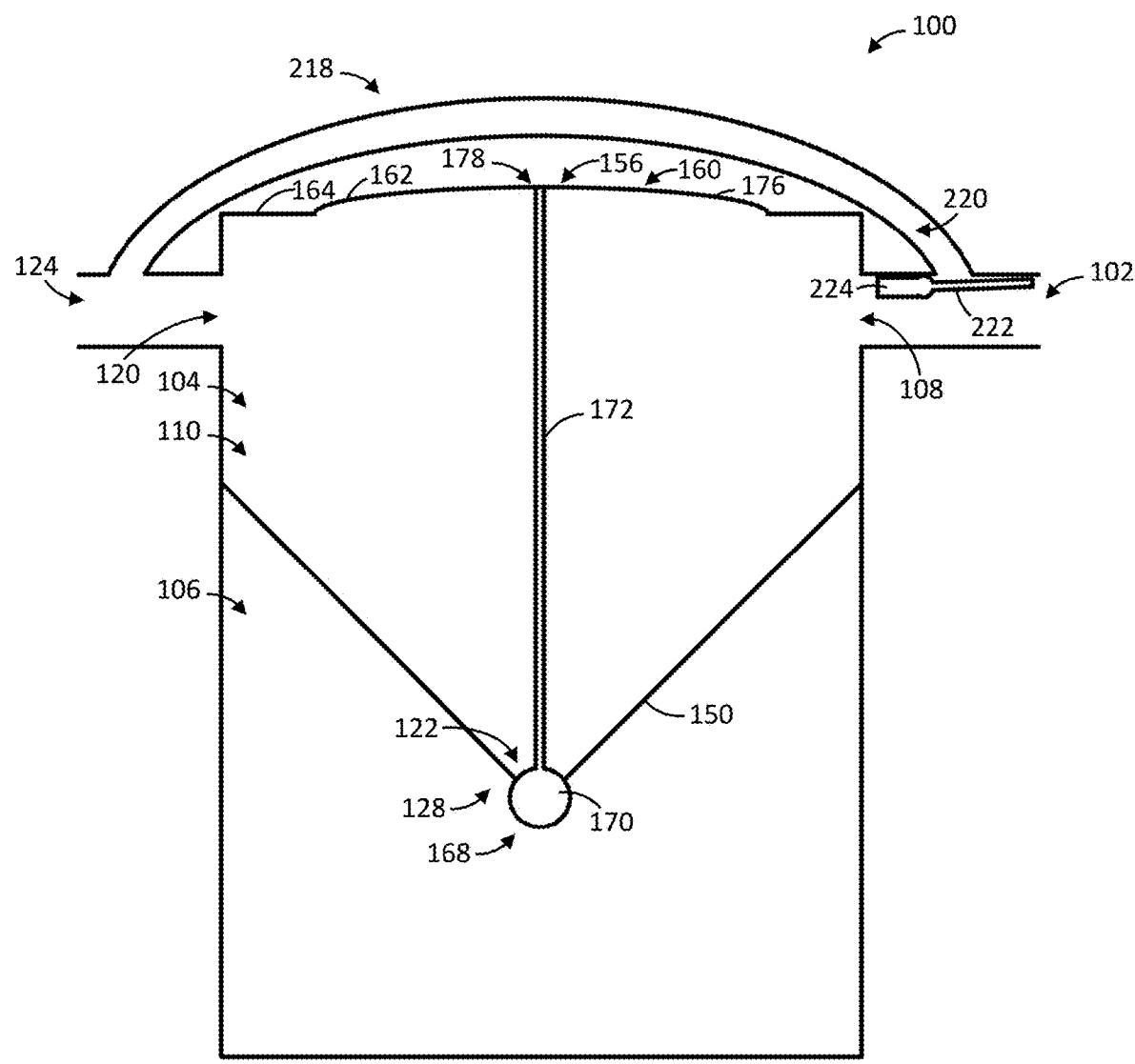
FIG. 8A is a schematic illustration of a water separator, a water storage chamber, and a water separator bypass wherein a bypass valve of the water separator bypass is positioned to route an airflow to the water separator.
Figure 8B:
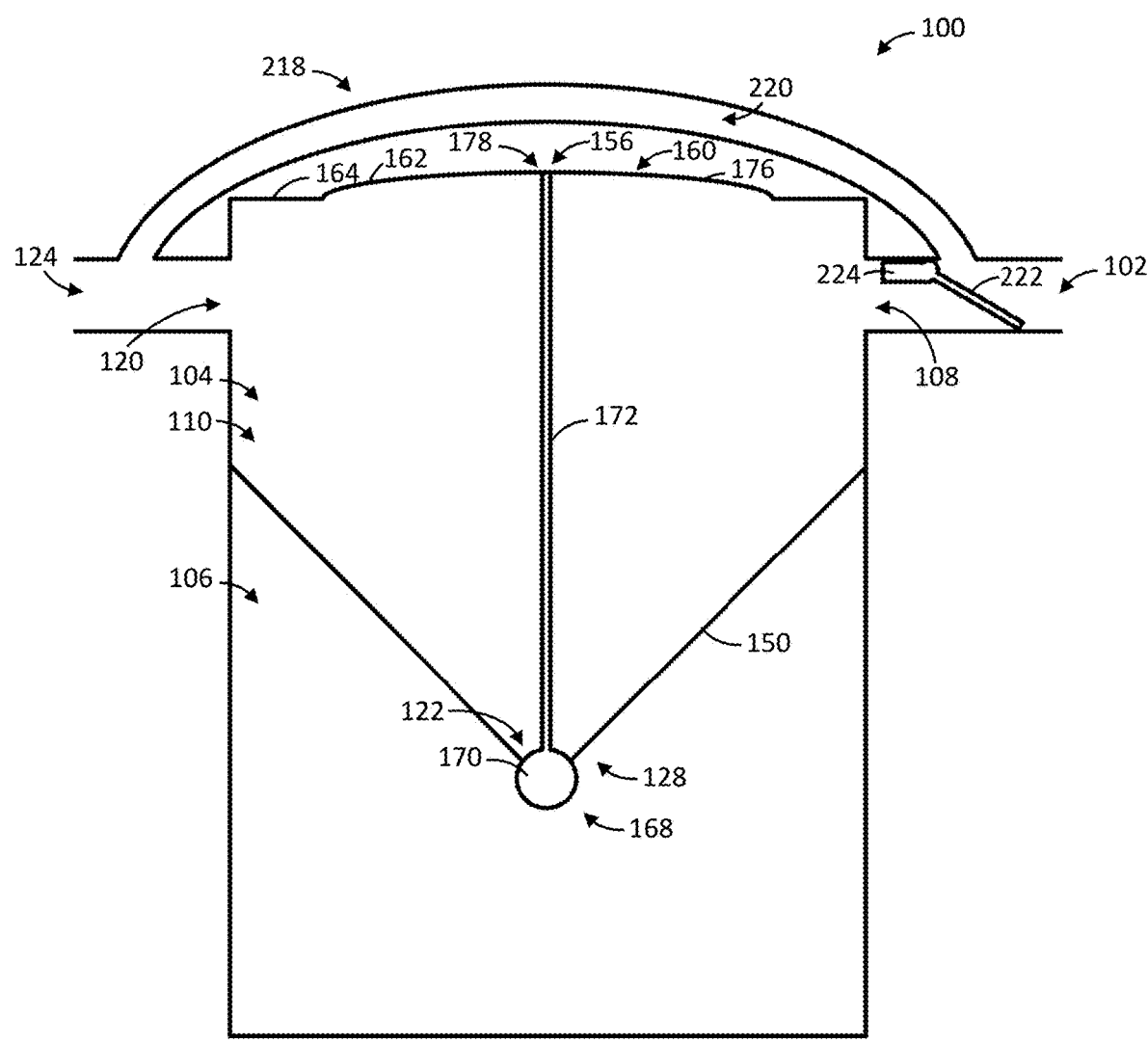
FIG. 8B is a schematic illustration of the water separator, water storage chamber, and water separator bypass of FIG. 8A wherein the bypass valve is positioned to route an airflow to a bypass channel of the water separator bypass.

Referring now to FIGS. 7A and 7B, in some examples, the reconfigurable mechanical member 160 may be mechanically connected to the pump 212. Specifically, in the example illustrated, the valve 168 of the automatic closure member 156 mechanically interacts with a control switch 214 of the pump 212. Accordingly, due to the movement of the automatic closure member 156, the pump 212 will be switched on (FIG. 8A) when the automatic closure member 156 is in the open position, and switch off when the automatic closure member 156 is in the closed position (FIG. 8B).

In examples of the appliance 100 that include an override member 186 and/or a shut off member 210, the override member 186 and/or the shut off member 210 may be operable to maintain the pump 212 in a de-energized state.

General Description of a Water Separator Bypass

In accordance with one aspect of this disclosure, which may be used by itself or in combination with any other aspect of this disclosure, the appliance 100 includes a water separator bypass 218. The water separator bypass 218 may be operable to direct some or all of the air drawn into the appliance 100 through the appliance inlet 102 around the water separator 104.

It may be desirable to include a water separator bypass 218 in appliances 100 that are not always used to separate air from water. For example, carpet extractors may have a vacuum cleaning mode. One might use the vacuum cleaning mode when it is unlikely that water will be drawn into the appliance 100. When in vacuum cleaning mode, it may be desirable to bypass the water separator 104 because there is no water in the air flow and the efficiency and/or suction force of the vacuum may increase when the water separator 104 is bypassed.

Alternatively, it may be desirable to bypass the water separator 104 when, for example, the water storage chamber 106 and/or reservoir is full.

The water separator bypass 218 may include a bypass channel 220 for the water and/or air to flow through as well as a bypass valve 222 to divert the water and/or air to the water separator 104 or the bypass channel 220.

The bypass valve 222 may be controlled by an actuator 224 that receives a signal based on any measurable and/or detectable characteristic of the appliance 100. For example, the actuator 224 may position the bypass valve 222 so that the air flow path 126 is directed to the bypass channel 220 when a moisture sensor upstream of the bypass valve 222 measures no or low moisture in the air drawn into the appliance 100. It will be appreciated that other sensors, such as a conductivity sensor, may be used. In some examples, the moisture sensor may measure the moisture level in the environment external to the appliance proximate to the appliance inlet 102. Alternatively, in examples of the appliance 100 that include an override member 186 and/or a shut off member 210, the override member 186 and/or the shut off member 210 may be operable to signal the actuator 224 to position the bypass valve 222. For example, if the override member 186 detects that the water storage chamber 106 is full, a full signal may be sent to the actuator 224 which may reposition the bypass valve 222 so that the air flow path 126 is directed to the bypass channel 220.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An appliance comprising:
   (a) an air flow path extending from an appliance inlet, by which water and air are introduced to the appliance, to an air outlet;
   (b) a water separator positioned in the air flow path, the water separator having a water separator inlet, a water separator air outlet, and a water separator water outlet wherein, when in operation, the water separator separates the water from the air;
   (c) a water storage chamber in fluid flow communication with the water separator water outlet, wherein the water storage chamber stores the water separated from the air by the water separator;
   (d) an automatic closure member which is moveable between an open position in which the water storage chamber is in fluid flow communication with the water separator and a closed position in which the water storage chamber is isolated from the water separator; and,
   (e) a shut off member operable to shut off the appliance when the water storage chamber has a predetermined amount of water therein.

2. The appliance of claim 1 wherein the automatic closure member moves from the open position to the closed position when a pressure in the water separator increases above a predetermined level.

3. The appliance of claim 2 wherein the automatic closure member comprises a reconfigurable mechanical member which changes configuration when the pressure in the water separator increases above the predetermined level.

4. The appliance of claim 3 wherein the reconfigurable mechanical member comprises a resilient member.

5. The appliance of claim 4 wherein the reconfigurable mechanical member comprises a diaphragm.

6. The appliance of claim 3 wherein the automatic closure member further comprises a valve drivenly connected to the reconfigurable mechanical member, the valve isolates the water storage chamber from the water separator when the automatic closure member is in the closed position.

7. The appliance of claim 6 further comprising a solenoid operably connected to the valve wherein the solenoid closes the valve when the pressure in the water separator increases above a predetermined level.

8. The appliance of claim 3 wherein the automatic closure member further comprises a valve mechanically drivenly connected to the reconfigurable mechanical member, the valve isolates the water storage chamber from the water separator when the automatic closure member is in the closed position.

9. The appliance of claim 1 wherein the automatic closure member further comprises a valve moveable between an open position in which the water storage chamber is in fluid flow communication with the water separator and a closed position in which the water storage chamber is isolated from the water separator, a solenoid drivingly connected to the valve, and a sensor which issues a closure signal to the solenoid when the pressure in the water separator increases above the predetermined level, wherein the solenoid causes the valve to move to the closed position upon the sensor issuing the closure signal.

10. The appliance of claim 1 further comprising an override member operable to maintain the water storage chamber isolated from the water separator when the water storage chamber has a predetermined amount of water therein.

11. The appliance of claim 10 wherein the override member comprises a sensor that issues a full signal upon the water storage chamber having the predetermined amount of water therein and the automatic closure member is moved to the closed position upon the issuance of the full signal.

12. The appliance of claim 11 wherein the automatic closure member further comprises a valve that isolates the water storage chamber from the water separator when the automatic closure member is in the closed position and the valve is moved to the closed position upon the issuance of the full signal.

13. The appliance of claim 1 further comprising a shut off member operable to shut off the appliance when the water storage chamber has a predetermined amount of water therein.

14. The appliance of claim 13 wherein the shut off member comprises a sensor that issues a full signal upon the water storage chamber having the predetermined amount of water therein and the appliance is de-activated upon the issuance of the full signal.

15. The appliance of claim 14 wherein the sensor comprises a pressure sensor, a float switch, an acoustic signaling member, or a temperature sensor.

* * * * *